(12) United States Patent
Wang et al.

(10) Patent No.: US 10,623,635 B2
(45) Date of Patent: Apr. 14, 2020

(54) SYSTEM AND METHOD FOR SPECIFYING, SIGNALING AND USING CODING-INDEPENDENT CODE POINTS IN PROCESSING MEDIA CONTENTS FROM MULTIPLE MEDIA SOURCES

(71) Applicant: MediaTek Inc., Hsinchu (TW)

(72) Inventors: Xin Wang, Rancho Palo Verdes, CA (US); Lulin Chen, Elk Grove, CA (US); Wang Lin Lai, San Jose, CA (US); Shan Liu, San Jose, CA (US)

(73) Assignee: MEDIATEK INC., Hsin-Chu (TW)

(*) Notice: Subject to any disclaimer, the term of this patent is extended or adjusted under 35 U.S.C. 154(b) by 183 days.

(21) Appl. No.: 15/709,695

(22) Filed: Sep. 20, 2017

(65) Prior Publication Data

US 2018/0091735 A1 Mar. 29, 2018

Related U.S. Application Data

(60) Provisional application No. 62/398,549, filed on Sep. 23, 2016, provisional application No. 62/401,276, filed on Sep. 29, 2016.

(51) Int. Cl.
*H04N 9/80* (2006.01)
*H04N 5/232* (2006.01)
*H04N 19/597* (2014.01)
*G11B 27/34* (2006.01)
*H04N 5/92* (2006.01)

(52) U.S. Cl.
CPC ......... *H04N 5/23238* (2013.01); *G11B 27/34* (2013.01); *H04N 19/597* (2014.11)

(58) Field of Classification Search
USPC .................................................. 386/326, 248
See application file for complete search history.

(56) References Cited

U.S. PATENT DOCUMENTS

| | | | | |
|---|---|---|---|---|
| 2001/0012600 A1* | 8/2001 | Hunt | ...................... | H05K 1/162 430/313 |
| 2008/0309669 A1* | 12/2008 | Choi | ...................... | G06T 15/10 345/427 |
| 2014/0078144 A1* | 3/2014 | Berriman | ............... | A63F 13/10 345/426 |
| 2015/0172544 A1* | 6/2015 | Deng | ...................... | G06T 9/001 348/36 |

(Continued)

FOREIGN PATENT DOCUMENTS

| | | |
|---|---|---|
| CN | 101675663 A | 3/2010 |
| TW | 200642481 A | 12/2006 |

OTHER PUBLICATIONS

Taiwan Intellectual Property Office, Office Action for Taiwan Patent Application No. 106132593, dated Aug. 23, 2018.

*Primary Examiner* — Nigar Chowdhury
(74) *Attorney, Agent, or Firm* — Han IP PLLC; Andy M. Han

(57) ABSTRACT

A method that specifies, signals and uses coding-independent code points (CICP) in processing media contents from multiple media sources is provided. An apparatus implementing the method receives media contents captured by a plurality of media sources in one or more clusters. The apparatus processes the media contents to provide a plurality of coding-independent code points for the plurality of media sources. The apparatus also encodes the media contents to provide at least one elementary stream.

20 Claims, 19 Drawing Sheets

(56) References Cited

U.S. PATENT DOCUMENTS

| | | | | |
|---|---|---|---|---|
| 2015/0358612 A1* | 12/2015 | Sandrew | ............ | H04N 5/23238 348/36 |
| 2015/0358613 A1* | 12/2015 | Sandrew | ............... | G06T 15/205 348/36 |
| 2017/0302714 A1* | 10/2017 | Ramsay | ................. | G06F 3/0482 |
| 2018/0077210 A1* | 3/2018 | Hannuksela | ........ | H04L 65/4076 |

* cited by examiner

| Shape | Image(t) | Image Illustration |
|---|---|---|
| Rectangle | $t^{(R)} = (w, h)$<br>where w = width, and h = height | 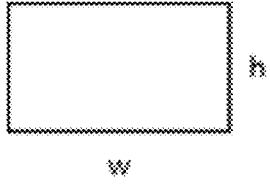 |
| Square | $t^{(S)} = d$<br>where d = size of the square |  |
| Circle | $t^{(C)} = r$<br>where r = radius | 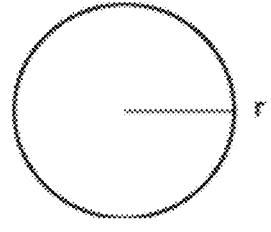 |
| Triangle (Symmetric) | $t^{(T)} = (w, h)$<br>where w = width, and h = height | 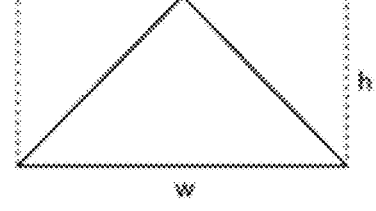 |
FIG. 3

| Geometry Type | Comment |
|---|---|
| Sphere 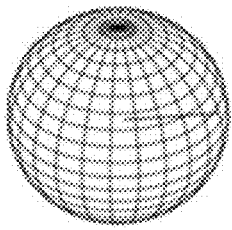 | Cluster of 3-d viewports with positions at the center of the sphere |
| Cube 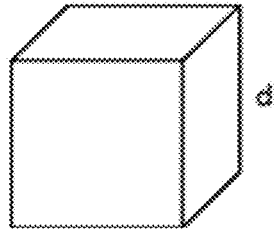 | Cluster of 6 3-d viewports with positions at the center of the cube |
| Cylinder 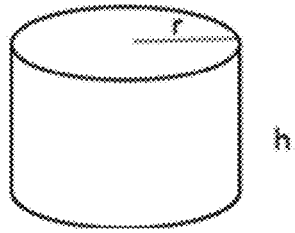 | Cluster of at least 3 3-d viewports with positions at the center of the cylinder, with 2 having circular images (top and bottom), and 1 or more viewports forming the cylindrical surface |
| Ring 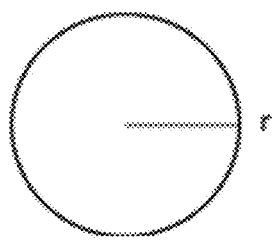 | Cluster of 2-d viewports with positions on the ring and rotation pointing to the center of the rectangle |
| Rectangle 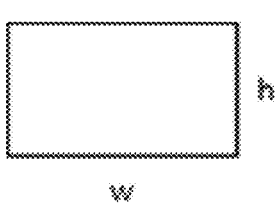 | Cluster of 2-d viewports with positions on the rectangle and rotation pointing to the center of the rectangle |
| Line  | Cluster of 1-d viewports arranged on a line segment of length l |

FIG. 6

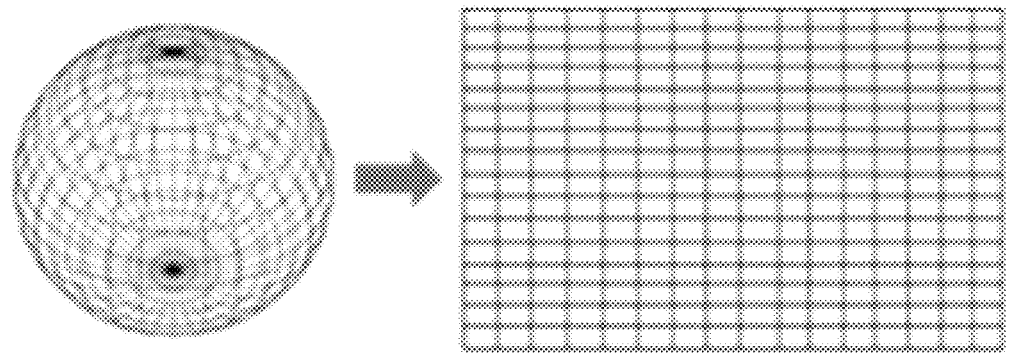
(A)
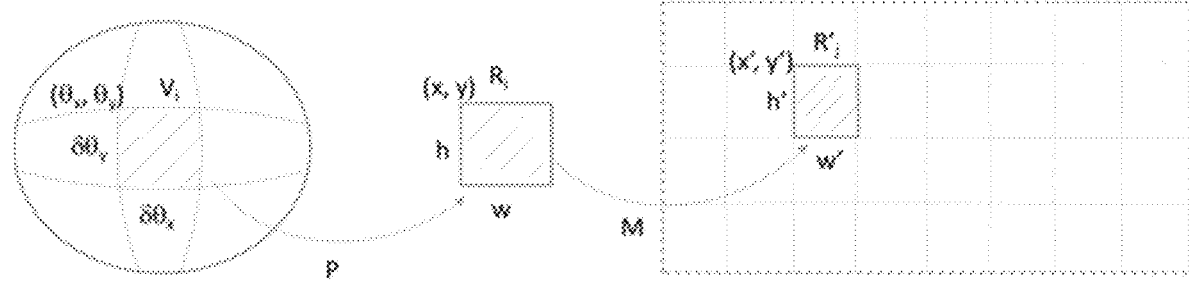
(B)
FIG. 8

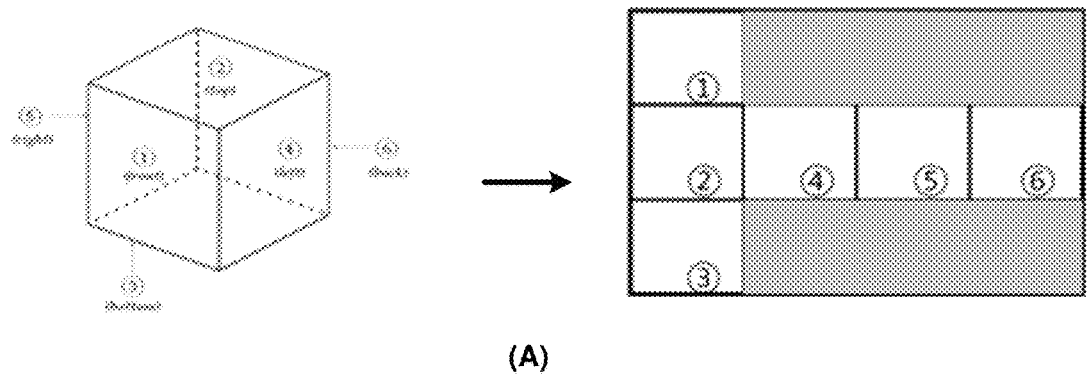
(A)
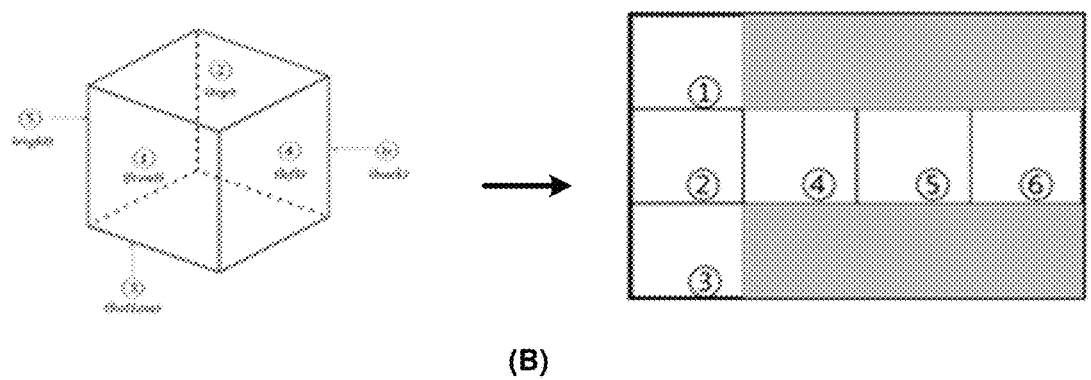
(B)
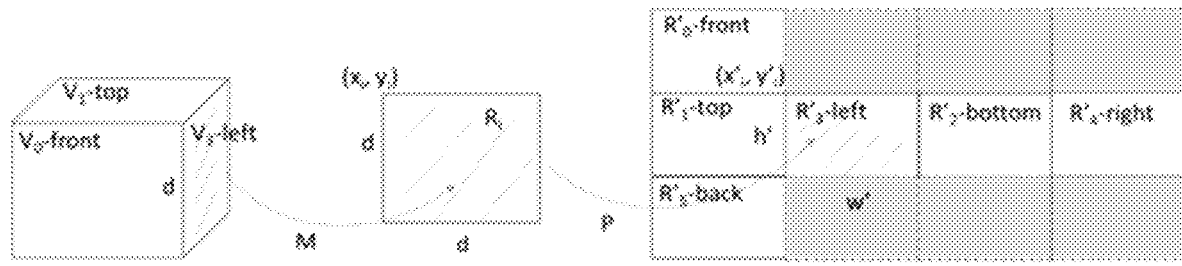
(C)
FIG. 9

| Value | Geometry type | Comment |
|---|---|---|
| 0 | Reserved | Reserved for 3D geometry types |
| 1 | Sphere<br>• r: radius, optional<br>• (x, y, z): location of the center with respect to a reference coordinate system, optional | 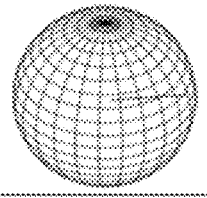 |
| 2 | Cube<br>• d: size, optional<br>• (x, y, z): location of the top-left corner of the front surface with respect to a reference coordinate system, optional | 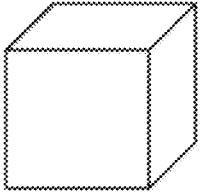 |
| 3 | Cylinder<br>• r: radius, optional<br>• (x, y, z): location of the center of the top circular surface with respect to a reference coordinate system, optional<br>• h: height, optional | 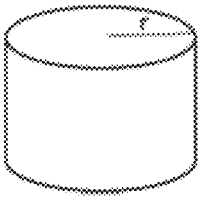 |
| 4-199 | Reserved | Reserved for other 3D geometry types |
| 200 | Reserved | Reserved for 2D geometry types |
| 201 | Ring<br>• r: radius, optional<br>• (x, y): location of the center with respect to a reference coordinate system, optional | 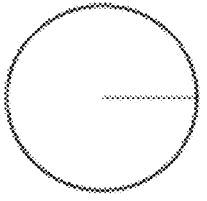 |
| 202 | Rectangle<br>• w: width, mandatory<br>• h: height, mandatory<br>• (x, y): location of the top-left corner of the rectangle with respect to a reference coordinate system, optional |  |
| 203-255 | Reserved | Reserved for other 2D geometry types |

FIG. 11

| Value | View Characteristics | Comment |
|---|---|---|
| 0 | Reserved | |
| 1 | Rectangle<br>• w: width, mandatory<br>• h: height, mandatory<br>• (x, y): location of the top-left corner of the rectangle with respect to a reference coordinate system, optional |  |
| 2 | Square<br>• d: dimension, optional<br>• (x, y): location of the center with respect to a reference coordinate system, optional |  |
| 2 | Circle<br>• r: radius, optional<br>• (x, y): location of the center with respect to a reference coordinate system, optional | 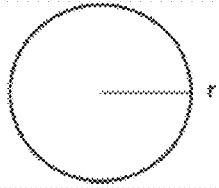 |
| 3 | Triangle<br>• w: width, mandatory<br>• h: height, mandatory<br>• (x, y): location of the top-left corner of the rectangle with respect to a reference coordinate system, optional | 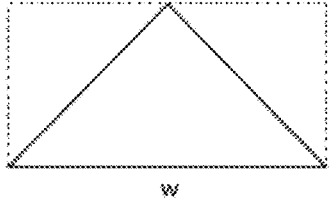 |
| 4-15 | Reserved | for other view shapes and sizes |

FIG. 12

| Value | Code | Projection type | Comment |
|---|---|---|---|
| 0 | RES | Reserved | |
| 1 | SUF | Sphere Unfolding: $P(V_0, ..., V_{K-1}) = (R_0, ..., R_{K-1})$ where $V_i = (\tau, \rho, \iota)$, $\tau = (0, 0, 0)$, $\rho = (\theta_x, \theta_y, 0)$, $\iota^{(in)} = (\delta\theta_x, \delta\theta_y)$ and $R_i = (\lambda, \iota)$, $\lambda = (\theta_x, \theta_y)$, $\iota^{(in)} = (\delta\theta_x, \delta\theta_y)$ | |
| 2 | CUF | Cube Unfolding: $P(V_0, ..., V_5) = (R_0, ..., R_5)$ where $V_i = (\tau_i, \rho_i, \iota_i)$ with $\tau_i = (0, 0, 0)$ $\rho_0 = (0, 0, 0)$ $\rho_1 = (0, 90, 0)$ $\rho_2 = (0, -90, 0)$ $\rho_3 = (90, 0, 0)$ $\rho_4 = (-90, 0, 0)$ $\rho_5 = (180, 0, 0)$ $\iota_i = d$ and $R_i = (\lambda_i, \iota_i)$, $\lambda_i = (x_i, y_i)$, $\iota_i = d$ with $x_0 = 0, y_0 = 3*d$ $x_1 = 0, y_1 = 2*d$ $x_2 = 2*d, y_2 = 2*d$ $x_3 = 2*d, y_3 = 2*d$ $x_4 = 2*d, y_4 = 2*d$ $x_5 = 0, y_5 = d$ | |
| 3-199 | | Reserved | Reserved for other projections related to 3D geometry types |
| 200 | | Reserved | |
| 201 | RUF | Ring Unfolding: $P(V_0, ..., V_{K-1}) = (R_0, ..., R_{K-1})$ where $V_i = (\lambda_i, \iota_i)$, $\lambda_i = (x_i, y_i)$ $= (\rho*\cos(\theta_i+180), \rho*\sin(\theta_i+180))$, with $\theta_i = i*360/n$ $\iota_i = (W, H)$ and $R_i = (\lambda_i, \iota_i)$, $\lambda_i = (i*W*(1-2*t), H)$, $\iota_i = (w, h) = (W*(1-2*t), H)$, with t as the overlay ratio removed on each side | |
| 202-255 | | Reserved | Reserved for other projections related to 2D geometry types |

FIG. 13

| Value | Code | Mapping type | Comment |
|---|---|---|---|
| 0 | | Reserved | |
| 1 | ATL | Array Tiling: $M(R_0, ..., R_{K-1}) = (R'_0, ..., R'_{K-1})$ where $K = M*N$, $j = k*M+l$, $R_i = (\lambda_i, t_i)$ with $\lambda_i = (x_i, y_i)$, $t_i = (w, h)$ $R'_j = (\lambda'_j, t'_j)$ $\lambda'_j = (x'_j, y'_j) = (k*c_x*w, l*c_y*h)$ $t'_j = (w', h') = (c_x*w, c_y*h)$ with scaling factors: $c_x, c_y$ | |
| 2 | TTL | T Tiling: $M(R_0, ..., R_5) = (R'_0, ..., R'_5)$ where $R_i = (\lambda_i, t_i)$ with $\lambda_i = (x_i, y_i)$, $t_i = (w, h)$ $R'_j = (\lambda'_j, t'_j)$ $\lambda'_j = (x'_j, y'_j)$ $x'_0 = 0, y'_0 = 3*c_y*h$ $x'_1 = 0, y'_1 = 2*c_y*h$ $x'_2 = 2*c_x*w, y'_2 = 2*c_y*h$ $x'_3 = 2*c_x*w, y'_3 = 2*c_y*h$ $x'_4 = 2*c_x*w, y'_4 = 2*c_y*h$ $x'_5 = 0, y'_5 = c_y*h$ $t'_j = (w', h') = (c_x*w, c_y*h)$ with scaling factors: $c_x, c_y$. Note that the above definition of the coordinates $x'_j, y'_j$ serves only as an example. They may be nominally defined differently. | |
| 3-199 | | Reserved | Reserved for other mappings related to 3D geometry types |
| 200 | | Reserved | |
| 201 | LTL | Line Tiling: $M(R_0, ..., R_{K-1}) = (R'_0, ..., R'_{K-1})$ where $R_i = (\lambda_i, t_i)$ with $\lambda_i = (x_i, y_i)$, $t_i = (w, h)$ $R'_j = (\lambda'_j, t'_j)$ with $\lambda'_j = (x'_j, y'_j) = (j*c_x*w, 0)$ $t' = (w', h') = (c_x*w, c_y*h)$ with scaling factors: $c_x, c_y$ | |
| 202-255 | | Reserved | Reserved for other mappings related to 2D geometry types |

FIG. 14

| Value | Code | Reverse Mapping type | Comment |
|---|---|---|---|
| 0 | | Reserved | |
| 1 | ADT | Array deTiling: $M_r(R'_0, ..., R'_{M-1}) = (R_0, ..., R_{M-1})$<br>where $K = M*N$, $j = k*M+i$,<br>$R'_j = (\lambda'_j, t'_j)$, $\lambda'_j = (x'_j, y'_j)$, $t'_j = (w'_j, h'_j)$<br>$R_i = (\lambda_i, t_i)$ with<br>$\lambda_i = (x_i, y_i) = (k*w'/c_x, l*h'/c_y, 0)$<br>$t_i = (w_i, h_i) = (w'/c_x, h'/c_y)$<br>with scaling factors: $c_x$, $c_y$ | 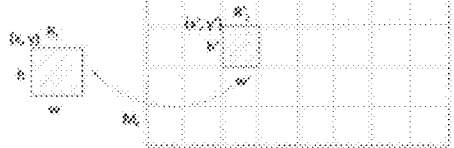 |
| 2 | TDT | T deTiling: $M_r(R'_0, ..., R'_5) = (R_0, ..., R_5)$<br>where<br>$R'_j = (\lambda'_j, t'_j)$, $\lambda'_j = (x'_j, y'_j)$, $t'_j = (w'_j, h'_j)$<br>$R_i = (\lambda_i, t_i)$<br>$\lambda_i = (x_i, y_i) = (i*w'/c_x, i*h'/c_y)$<br>$t_i = (w_i, h_i) = (w'/c_x, h'/c_y)$<br>with scaling factors: $c_x$, $c_y$.<br><br>Note that the above definition of the coordinates $x_i$, $y_i$ serves only as an example. They may be nominally defined differently. | 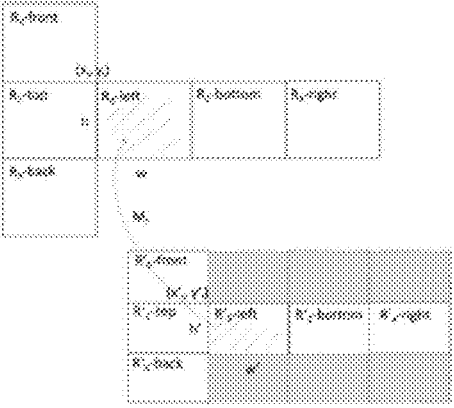 |
| 3-199 | | Reserved | Reserved for other reverse mappings related to 3D geometry types |
| 200 | | Reserved | |
| 201 | LDT | Line deTiling: $M_r(R'_0, ..., R'_{K-1}) = (R_0, ..., R_{K-1})$<br>where<br>$R'_j = (\lambda'_j, t'_j)$, $\lambda'_j = (x'_j, y'_j)$, $t'_j = (w'_j, h'_j)$<br>$R_i = (\lambda_i, t_i)$<br>$\lambda_i = (x_i, y_i) = (i*w'/c_x, h'/c_y)$<br>$t_i = (w_i, h_i) = (w'_i, h'_i) = (c_x*w_0, c_y*h_0)$<br>with scaling factors: $c_x$, $c_y$<br><br>Note that the above definition of the coordinates $x_i$, $y_i$ serves only as an example. They may be nominally defined differently. | 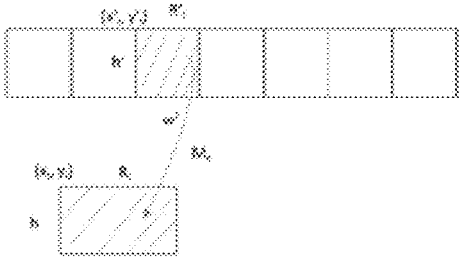 |
| 202-255 | | Reserved | Reserved for other reverse mappings related to 2D geometry types |

FIG. 15

| Value | Code | Reverse Projection type | Comment |
|---|---|---|---|
| 0 | | Reserved | |
| 1 | SPF | Sphere Forming: $P^{-1}(R_0, ..., R_{k-1}) = (V_0, ..., V_{k-1})$,<br>where $R_i = (\lambda_i, \iota_i)$, $\lambda_i = (x_i, y_i)$, $\iota_i = (w_i, h_i)$<br>and<br>$V_i = (\tau_i, \rho_i, \iota_i)$ with $\tau_i = (x_i, y_i, z_i) = (0, 0, 0)$,<br>$\rho_i = (x_i, y_i)$, $\iota_i = (\delta\theta_x, \delta\theta_y) = (w_i, h_i)$ | 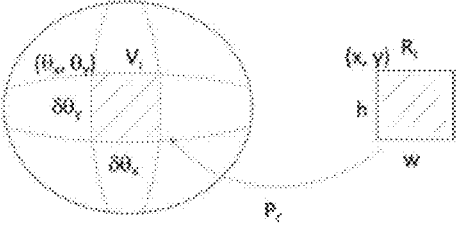 |
| 2 | CUF | Cube Forming: $P^{-1}(R_0, ..., R_5) = (V_0, ..., V_5)$,<br>where $R_i = (\lambda_i, \iota_i)$, $\lambda_i = (x_i, y_i)$, $\iota_i = d$ with<br>$\quad \lambda_0 = (0, 3*d)$,<br>$\quad \lambda_1 = (0, 2*d)$<br>$\quad \lambda_2 = (2*d, 2*d$<br>$\quad \lambda_3 = (2*d, 2*d)$<br>$\quad \lambda_4 = (2*d, 2*d)$<br>$\quad \lambda_5 = (0, d, 0)$<br>and $V_i = (\tau_i, \rho_i, \iota_i)$ with $\tau_i = (x_i, y_i, z_i) = (0, 0, 0)$, $\iota_i = d$,<br>$\quad \rho_0 = (0, 0, 0)$<br>$\quad \rho_1 = (0, 90, 0)$<br>$\quad \rho_2 = (0, -90, 0)$<br>$\quad \rho_3 = (90, 0, 0)$<br>$\quad \rho_4 = (-90, 0, 0)$<br>$\quad \rho_5 = (180, 0, 0)$ | 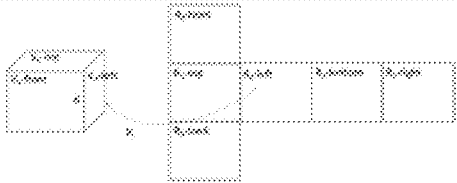 |
| 3-199 | | Reserved | Reserved for other reverse projections related to 3D geometry types |
| 200 | | Reserved | |
| 201 | RIF | Ring Forming: $P^{-1}(R_0, ..., R_{k-1}) = (V_0, ..., V_{k-1})$,<br>where $R_i = (\lambda_i, \iota_i)$,<br>$\quad \lambda_i = (x_i, y_i)$<br>$\quad \iota_i = (w, h)$<br>and $V_i = (\lambda_i, \iota_i)$<br>$\quad \lambda_i = (\rho*\cos(\theta_i+180), \rho*\sin(\theta_i+180))$,<br>$\quad$ with $\theta_i = i*360/n$<br>$\quad \iota_i = (W, H) = (w*(1+2*t), h)$ | 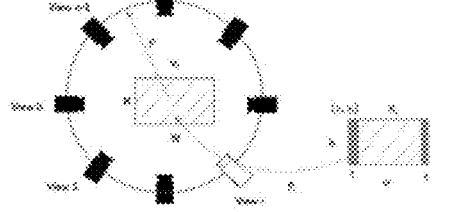 |
| 202-255 | | Reserved | Reserved for other reverse projections related to 2D geometry types |

FIG. 16

SYSTEM AND METHOD FOR SPECIFYING, SIGNALING AND USING CODING-INDEPENDENT CODE POINTS IN PROCESSING MEDIA CONTENTS FROM MULTIPLE MEDIA SOURCES

CROSS REFERENCE TO RELATED PATENT APPLICATIONS

The present disclosure is part of a non-provisional application that claims the priority benefit of U.S. Provisional Patent Application Nos. 62/398,549 and 62/401,276, filed on 23 Sep. 2016 and 29 Sep. 2016, respectively. Contents of above-listed applications are herein incorporated by reference in their entirety.

TECHNICAL FIELD

The present disclosure is generally related to media processing of multiple media sources. In particular, the present disclosure is related to systems and methods for specifying, signaling and using coding-independent code points (CICP) in processing media contents from multiple media sources.

BACKGROUND

Unless otherwise indicated herein, approaches described in this section are not prior art to the claims listed below and are not admitted as prior art by inclusion in this section.

Currently, there is an emerging variety of cameras and image or optical sensors that allow capturing of richer forms of visual media data along with the dimensions of space, in a large range of geometric arrangements. This variety includes multi-view arrays (e.g., linear, arc, planar, dome), 360° virtual reality (VR) camera settings, light-field cameras (e.g., camera arrays), 6-degree-of-freedom (6DoF) cameras or depth cameras. Different camera settings capture different representations of the light radiance of a three-dimensional (3D) space, and different representations can result in a spectrum from wide baseline and sparse multi-view arrays to narrow baseline and dense light-field data.

The specification of ISO/IEC 23001-8 intends to define various code points and fields that establish properties of a video or audio stream that are independent of the compression encoding and bit rate. However, in its latest edition, there lacks code points for multiple media sources, especially those captured by cameras and image or optical sensors, to provide characteristics of signals from the multiple media sources before the signals are compressed by corresponding encoders in a way that is suitable for facilitating compression of such input signals. There also lacks code points for multiple media sources, especially those captured by cameras and image or optical sensors, to provide properties that may describe the appropriate interpretation of decoded video or audio data. Without such coding-independent code points specified and signaled, it would be difficult to define other application-oriented specifications and systems that rely on these code points.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In one aspect, a method may involve receiving media contents captured by a plurality of media sources in one or more clusters. The method may also involve processing the media contents to provide a plurality of coding-independent code points for the plurality of media sources. The method may further involve encoding the media contents to provide at least one elementary stream.

In one aspect, an apparatus may include a processing circuit and an encoding circuit. The processing circuit may be capable of receiving media contents captured by a plurality of media sources in one or more clusters. The processing circuit may also be capable of processing the media contents to provide a plurality of coding-independent code points for the plurality of media sources. The encoding circuit may be capable of encoding the media contents to provide at least one elementary stream.

In one aspect, an apparatus may include a decoding circuit and a rendering circuit. The decoding circuit may be capable of decoding at least one elementary stream containing encoded media contents captured by a plurality of media sources in one or more clusters and a plurality of coding-independent code points for the plurality of media sources to provide one or more streams of decoded media contents. The rendering circuit may be capable of rendering one or more viewports, one or more regions, or a combination thereof based on video contents in the streams of decoded media contents.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 3 includes a table showing a number of example shapes of viewports in accordance with the present disclosure.

FIG. 6 includes a table showing example types of geometric shapes in which viewports can be formed in accordance with the present disclosure.

FIG. 8 is a diagram of example equirectangular projection and mapping for spherical viewports in accordance with the present disclosure.

FIG. 9 is a diagram of example cube projection and mapping for cubic square viewports in accordance with the present disclosure.

FIG. 11 includes a table showing example cluster geometry types in accordance with the present disclosure.

FIG. 12 includes a table showing example view characteristics in accordance with the present disclosure.

FIG. 13 includes a table showing example projection types in accordance with the present disclosure.

FIG. 14 includes a table showing example mapping types in accordance with the present disclosure.

FIG. 15 includes a table showing example reverse mapping types in accordance with the present disclosure.

FIG. 16 includes a table showing example reverse projection types in accordance with the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Overview

The present disclosure proposes systems and methods for specifying, signaling and using coding-independent code points (CICP) for multiple media sources in multiple clusters (or collections), at different media processing stages prior to encoding, as well as during delivery and processing after decoding. The present disclosure also proposes systems and methods that transform, via canonicalization, source content obtained from media sources (e.g., cameras) arranged in different geometric types onto a sphere first, and then process the canonicalized content using conventional and new content flow processes for the spherical content.

Figure 1:
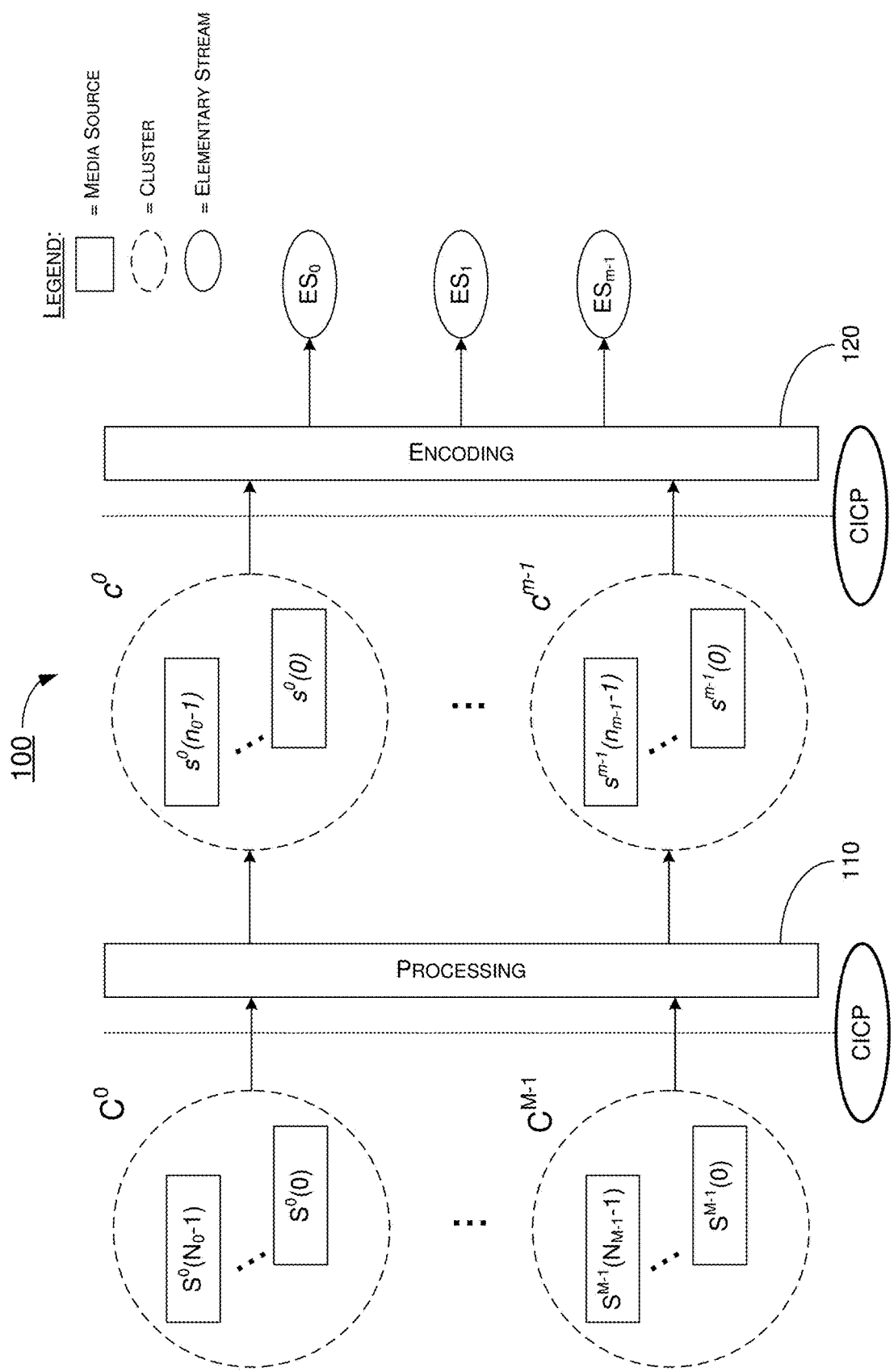
FIG. 1 is a diagram of an example scenario in which various examples in accordance with the present disclosure may be implemented.

FIG. 1 illustrates an example scenario 100 in which various examples in accordance with the present disclosure may be implemented. In scenario 100, multiple media sources $S^0(0) \sim S^{M-1}(N_{M-1}-1)$, which provide video (sequence or sequences of images), still images and/or other types of media (e.g., audio, textual), may conceptually or physically grouped into a number of clusters $C^0 \sim C^{M-1}$, where each of M and N is a positive integer greater than 1. The clusters $C^0 \sim C^{M-1}$ of one or more types of media sources provide one or more types of media to be processed at processing stage 110 prior to encoding. For simplicity, a given type (e.g., video) of the one or more types of processed media post processing by processing stage 110 is shown, as multiple media sources $s^0(0) \sim s^{m-1}(n_{m-1}-1)$ that are grouped into multiple clusters $c^0 \sim c^{m-1}$ to provide the given type of media for encoding at encoding stage 120 that provides a number of elementary streams $ES_0 \sim ES_{m-1}$. As shown in FIG. 1, proposed schemes, concepts, methods and techniques with respect to CICP in accordance with the present disclosure may be applied prior to each of processing stage 110 and encoding stage 120.

The proposed schemes, concepts, methods, systems and techniques in accordance with the present disclosure may be utilized in a wide range of target applications, thereby allowing media processing of collections of media source contents prior to encoding. The target applications may include, for example and without limitation, 360° (omnidirectional) videos, free viewpoint television (FVT), point cloud type applications for reconstructing an object or a scene as a composition of multiple media sources (with depth information) before encoding and after decoding, and light fields including media sensors.

In various implementations in accordance with the present disclosure, the proposed CICP may support capturing of multiple viewports at sources, as well as regions after projection mapping, as code points. The proposed CICP may enable multiple viewport- and region-based adaptive streaming. Additionally, the proposed CICP may support construction of arbitrarily selected viewports at sinks. Moreover, the proposed CICP may facilitate upstream and downstream viewport stitching, projection and mapping. Furthermore, the proposed CICP may provide information for signaling carriage and reference of the code points in file format, streaming manifest and media orchestration for content storage, adaptive streaming and media composition.

Basic Notions

In the present disclosure, the notion "viewport" refers to a view (or image, scene) area observable by a viewer (or camera, image or optical sensor) within the three-/two-/one-dimensional space. In VR applications, a viewport may be a view area of a 3D spherical video.

In the present disclosure, the notion "region" refers to a view (or image, scene) area of a two-dimensional (2D) plane, observable by a viewer (or camera, image or optical sensor).

In the present disclosure, the notion "projection" refers to the process by which a viewport is projected onto a region.

In the present disclosure, the notion "mapping" refers to the process by which viewports are mapped to one or more other viewports and regions (possibly formed by a projection) that are mapped to one or more other regions on a 2D plane.

Degrees of Freedom in n-Dimensional Spaces

In terms of degrees of freedom (DoF) in n-dimensional spaces, any extent of the world observable at any given moment by a viewer or camera is that part of the world that is visible at a particular position and orientation in an n-dimensional space, where n=3, 2, 1. The DoF (of any rigid object) in an n-dimensional space are defined as a sum of n translational and n*(n−1) rotational degrees of freedoms. In the 3D space, there are six (=3+3*(3−1)/2) degrees of freedom (6DoF), as shown in part (A) of FIG. 2, with three of the 6DoF being translational and the other three of the 6DoF being rotational. The three translational degrees of freedom in the 3D space include the following: moving left and right along the X-axis (swaying), moving up and down along the Y-axis (heaving), and moving forward and backward along the Z-axis (surging). The three rotational degrees of freedom in the 3D space include the following: tilting forward and backward around the X-axis (pitching), turning left and right around the Y-axis (yawing), and tilting side to side around the Z-axis (rolling). Thus, any viewer (or camera, image or optical sensor) in the 3D space has three degrees of freedom in spatial translation of the body of the viewer, and three degrees of freedom in angular rotation of the head (or lens) of the viewer.

Figure 2:
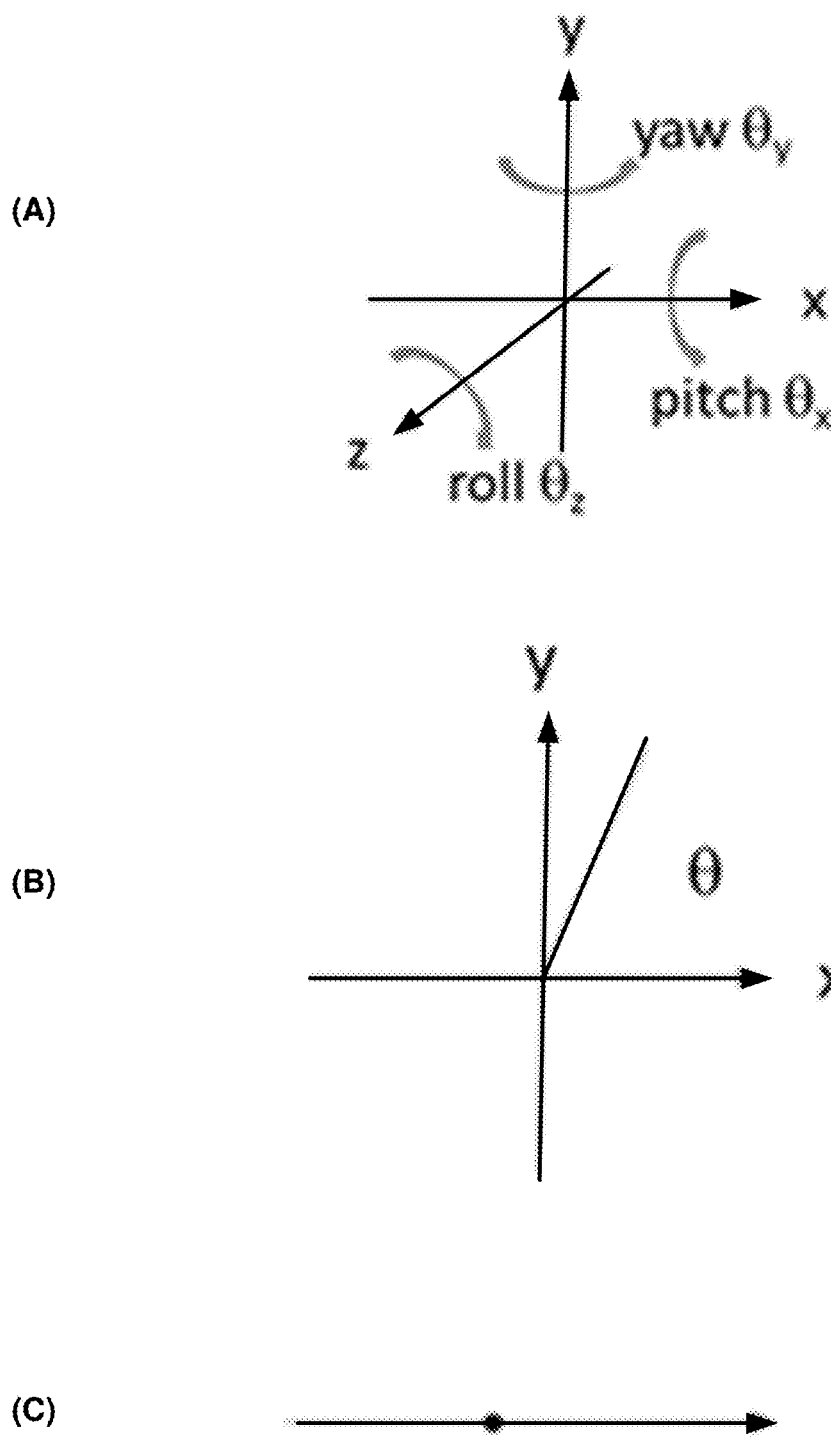
FIG. 2 is a diagram of degrees of freedom in n-dimensional spaces in which various examples in accordance with the present disclosure may be implemented.

In the 2D space, there are three (=2+2*(2−1)/2) degrees of freedom (3DoF), as shown in part (B) of FIG. 2, with two of the 3DoF being related to translation along X- and Y-axes, (x, y), and one of the 3DoF being related to rotation, θ. The two translational degrees of freedom in the 2D space include the following: moving left and right along the X-axis (swaying) and moving up and down along the Y-axis (heaving). The rotational degree of freedom in the 2D space includes turning clockwise and counterclockwise around the center (turning). Similarly, any viewer (or camera, image or optical sensor) in the 2D space has two degrees of freedom in spatial translation of the body of the viewer, and one degree of freedom in angular rotation of the head (or lens) of the viewer.

In the 1D space, there is one (=1+1*(1−1)/2) degree of freedom (1DoF), as shown in part (C) of FIG. 2. The one degree of freedom is related to translation along the X-axis, x. The translational degree of freedom in the 1D space includes moving left and right along the X-axis (swaying). This means that any viewer (or camera, image or optical sensor) in the 1D space has merely one degree of freedom, moving left and right, in spatial translation of the body of the viewer, and no/zero degree of freedom in angular rotation of the head (or lens) of the viewer.

Viewports

In the present disclosure, a viewport V is considered in a general sense as a view (or a scene, an image) area in an n-dimensional (nD) space, even though in the omnidirectional video applications a viewport has typically been considered primarily as an area of a 3D spherical video. Thus, a viewport V is determined by its point in the space of (n+n*(n−1)/2) degrees of freedom, and a view (or scene, image) with certain geometric shape and size. The purpose of the generalization is to extend the coverage of viewports in the 3D space as well as ones in the 2D and 1D spaces for a much wider range of applications.

Formally, a viewport V is represented as follows:

$$V=(\tau,\rho,\iota)$$

Here, τ denotes translation (or position), ρ denotes rotation, and ι denotes image (or view, scene) shape. An intuitive interpretation of a viewport may be that a viewport is an image with shape ι at translation τ with rotation ρ.

Depending on the dimension of the space, a viewport may have different representation forms of its translation τ and rotation ρ, as shown in Table 1 below.

TABLE 1

Translations and Rotations of Viewports

| Dimension | Translation and Rotation (τ and ρ) | Range |
|---|---|---|
| n = 3 | $\tau^{(3)} = (x, y, z)$, $\rho^{(3)} = (\theta_x, \theta_y, \theta_z)$ | ∞ < x, y, z < ∞<br>180° ≤ $\theta_x$, $\theta_y$, $\theta_z$ ≤ 180° (or 0° ≤ $\theta_x$, $\theta_y$, $\theta_z$ ≤ 360°) |
| n = 2 | $\tau^{(2)} = (x, y), \rho^{(2)} = \theta$ | ∞ < x, y < ∞<br>180° ≤ θ ≤ 180° (or 0° ≤ θ ≤ 360°). |
| n = 1 | $\tau^{(1)} = x$ | ∞ < x < ∞ |

Note that, in many applications, actual range values that translation and rotation can take are discrete and possibly even finite. In those cases, these values may be represented as descriptive values, such as "center", "left", "right", "up", "down", "front" and "back" for translation (in some default units for (x, y, z)), and "forward" ($\theta_x=\theta_y=\theta_z=0$), "upward" ($\theta_x=90°$), "downward" ($\theta_x=-90°$), "leftward" ($\theta_y=90°$), "rightward" ($\theta_y=-90°$), "backward" ($\theta_y, =180°$), "clockwise" ($\theta_z=90°$), and "counter-clockwise" ($\theta_z=-90°$) for rotation (e.g., rotating in the unit of 90°).

Depending on its shape, a viewport may have different forms of representation of its image (or view, scene). FIG. 3 illustrates a number of example shapes of viewports. It is noteworthy that, in some situations, there may be other ways to represent views and their shapes. For instance, a rectangle may be represented in a range form, as follows:

$$\iota(R)=(x_1,x_2,y_1,y_2)$$

Here, ($x_1$, $x_2$) and ($y_1$, $y_2$) are coordinate ranges (start and end) in some reference coordinate system, and w=|$x_1$-$x_2$| and h=|$y_1$-$y_2$|.

Figure 4:
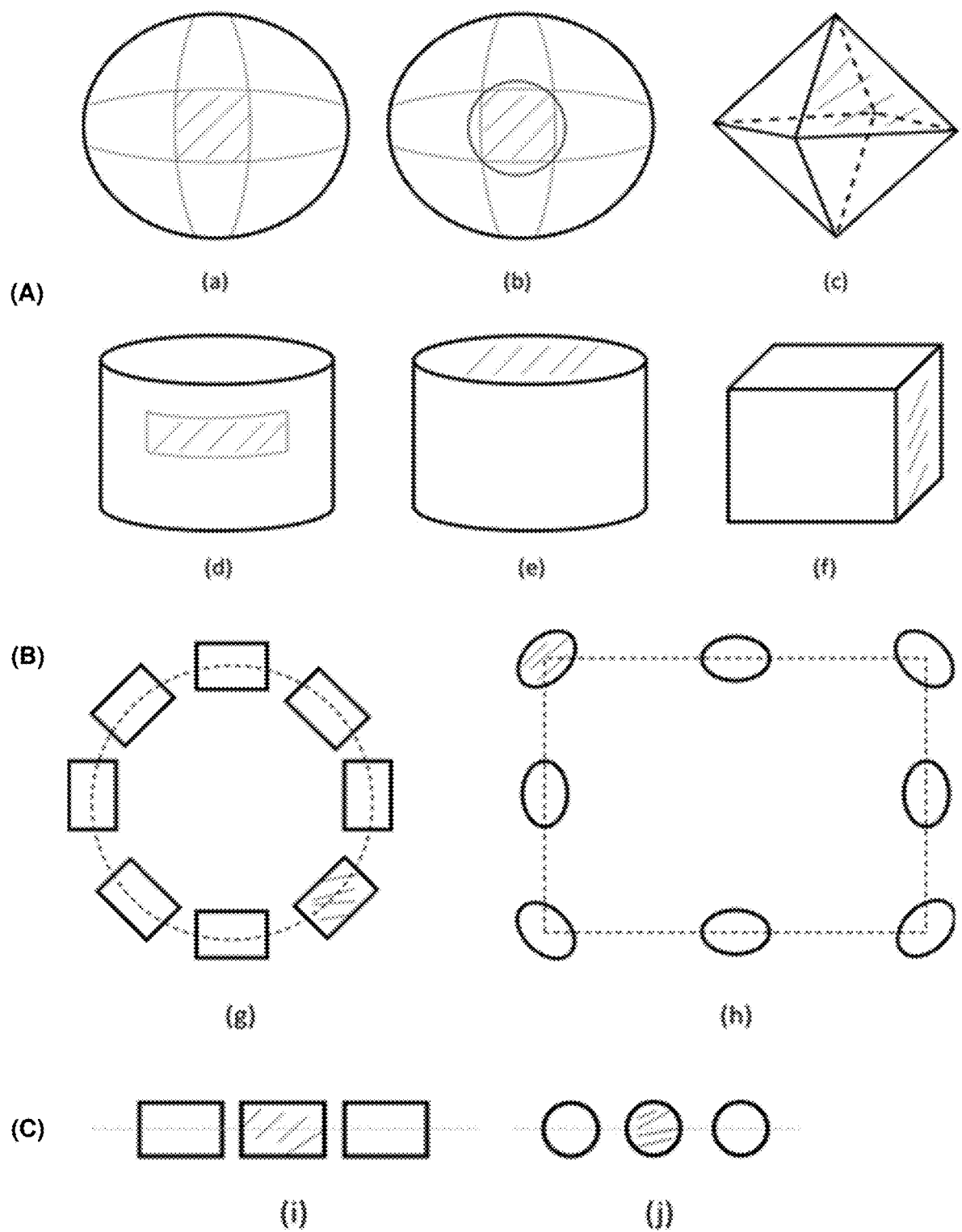
FIG. 4 is a diagram of example viewports in n-dimensional spaces in accordance with the present disclosure.

Part (A) of FIG. 4 illustrates a number of example viewports in the 3D space. These example viewports may be represented as shown in Table 2 below.

TABLE 2

Example Viewports in 3D Space

| Viewport Type | Viewport V = (τ, ρ, ι) | Note |
|---|---|---|
| (a) Rectangular on sphere | $\tau^{(3)} = (x, y, z)$<br>$\rho^{(3)} = (\theta_x, \theta_y, \theta_z)$<br>$\iota^{(R)} = (\delta\theta_x, \delta\theta_y)$ | $\delta\theta_x$ and $\delta\theta_y$ represent the off-sets in the pitch and yaw rotations with respect to $\theta_x$ and $\theta_y$ |
| (b) Circular on sphere | $\tau^{(3)} = (x, y, z)$<br>$\rho^{(3)} = (\theta_x, \theta_y, \theta_z)$<br>$\iota^{(C)} = r$ | r is the radius of the circular image |
| (c) Triangular on octahedron | $\tau^{(3)} = (x, y, z)$<br>$\rho^{(3)} = (\theta_x, \theta_y, \theta_z)$<br>$\iota^{(T)} = (w, h)$ | (w, h) are the width and height of the triangular image |
| (d) Rectangular on cylinder | $\tau^{(3)} = (x, y, z)$<br>$\rho^{(3)} = (\theta_x, \theta_y, \theta_z)$<br>$\iota^{(R)} = (\delta\theta_y, \delta y)$ | $\delta\theta_y$ and δy represent the yaw rotation and the height of the image in $\theta_y$ and y |
| (e) Circular on cylinder | $\tau^{(3)} = (x, y, z)$<br>$\rho^{(3)} = (\theta_x, \theta_y, \theta_z)$<br>$\iota^{(C)} = r$ | $\theta_y$ = ±90°, and r is the radius of the top or bottom circle |
| (f) Rectangular on cube | $\tau^{(3)} = (x, y, z)$<br>$\rho^{(3)} = (\theta_x, \theta_y, \theta_z)$<br>$\iota^{(S)} = d$ | $\theta_x$ = 0°, ±90° and 180°, $\theta_y$ = 0°, ±90°, and d is the size of the cube. |

TABLE 2-continued

Example Viewports in 3D Space

| Viewport Type | Viewport V = (τ, ρ, ι) | Note |
|---|---|---|
| | Or, in descriptive form:<br>$\tau^{(3)}$ = "Center"<br>$\rho_i^{(3)}$<br>$\iota^{(S)}$ = d<br>where<br>$\rho_0^{(3)}$ = ("F", "F", "F") = "Front"<br>$\rho_1^{(3)}$ = ("U", "F", "F") = "Top"<br>$\rho_2^{(3)}$ = ("D", "F", "F") = "Bottom"<br>$\rho_3^{(3)}$ = ("F", "L", "F") = "Left"<br>$\rho_4^{(3)}$ = ("F", "R", "F") = "Right"<br>$\rho_5^{(3)}$ = ("F", "B", "F") = "Back" | Alternatively, the<br>viewports corresponding<br>to the 6 surfaces $S_0, \ldots, S_5$<br>of the cube can have<br>descriptive descriptions,<br>when using the discrete<br>and descriptive values of<br>translation and rotation,<br>where<br>"F" = "Forward"<br>"U" = "Upward"<br>"D" = "Downward"<br>"L" = "Leftward"<br>"R" = "Rightward"<br>"B" = "Backward" |

Part (B) of FIG. 4 illustrates two example viewports in the 2D space. These example viewports may be represented as shown in Table 3 below.

TABLE 3

Example Viewports in 2D Space

| Viewport Type | Viewport V = (τ, ρ, ι) | Note |
|---|---|---|
| (g) Rectangle on ring | $\tau^{(2)}$ = (x, y)<br>$\rho^{(2)}$ = θ<br>$\iota^{(R)}$ = (w, h) | (w, h) are the width and height of the rectangular area |
| (h) Circle on Rectangle | $\tau^{(2)}$ = (x, y)<br>$\rho^{(2)}$ = θ<br>$\iota^{(C)}$ = r | r is the radius of the circular area |

Part (C) of FIG. 4 illustrates two example viewports in the 1D space. These example viewports may be represented as shown in Table 4 below.

TABLE 4

Example Viewports in 1D Space

| Viewport Type | Viewport V = (τ, ρ, ι) | Note |
|---|---|---|
| (i) Rectangle on line | $\tau^{(1)}$ = x<br>$\iota^{(R)}$ = (w, h) | (w, h) are the width and height of the rectangular area |
| (j) Circle on line | $\tau^{(1)}$ = x<br>$\iota^{(C)}$ = r | r is the radius of the circular area |

Viewports may change in motion along passage of time. A dynamic (or motion) viewport is a sequence V(t) of viewports that are time dependent. In a discrete time, a dynamic viewport may be expressed in an absolute form as follows:

$$V(t), V(t+1), \ldots,$$

Alternatively, a dynamic viewport may be expressed in the incremental form as follows:

$$V(t), V(t+1) = V(t) + \delta V(t), \ldots$$

Figure 5:
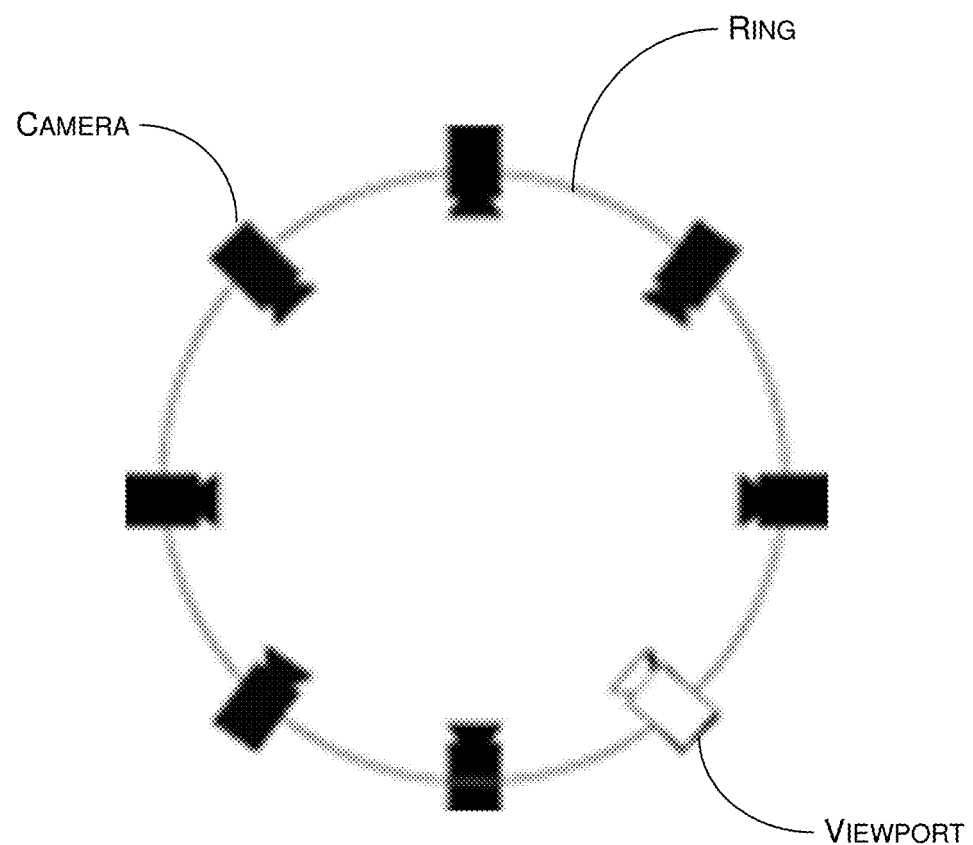
FIG. 5 is a diagram of a dynamic viewport generated by a camera moving around on a ring in accordance with the present disclosure.

A dynamic viewport may provide a video (a sequence of images, views or scenes) observable by a viewer (or camera, image or optical sensor) when wandering around within the 3D/2D/1 D space, thereby reflecting the media content captured when the viewport changes its translation, rotation and possibly shape. An n-dimensional dynamic viewport with translation and rotation restricted to n-dimensions, where n=3, 2, 1. For instance, as shown in FIG. 5, a viewport generated by one of multiple cameras on a ring moving around on the ring is a 2D dynamic viewport.

When a dynamic viewport V(t) does not change in some of its dimensions (e.g., position, rotation and/or shape), its representation may be simplified. For instance, in omnidirectional video applications, viewport changes usually only involve changes in the pitch and yaw rotations $\delta\theta_x(t)$ and $\delta\theta_y(t)$, but do not involve changes in the translations, roll rotation, and/or the viewport shapes and sizes. In such cases, a dynamic viewport V(t) may be represented in a very simplified form, with an initial viewport, $V(0)=V_0=(\tau_0, \rho_0, \iota_0)$, and a sequence of changes $\delta\theta x(t)$ and $\delta\theta y(t)$, t=1, 2, . . . and so on. In some applications, translation and rotation of a dynamic viewport may be related, which may also be used for simplifying viewport representation. For a dynamic viewport on a ring such as that shown in FIG. 5, the dynamic viewport may be represented by an initial viewport, $V(0)=V_0=(\tau^{(2)}_0, \rho^{(2)}_0, \iota_0)$, and a sequence of incremental changes SOW in its rotation θ.

Regions

In the present disclosure, a region is considered as an image (or view, scene) area of a 2D plane. In this sense, a region R is determined by its location on the plane and its geometric shape (including size). The difference between a region and a 2D viewport is that a region has no freedom in rotation, whereas a viewport does.

Formally, a region R is represented as follows:

$$R=(\lambda, \iota)$$

Here, λ=(x, y) denotes location, and ι denotes image shape. It is noteworthy that the location may be specified as, for example, the location of the top-left corner, bottom-left or the center of the image, with respect to a certain coordination system. Example shapes of regions of images may include the following: rectangle ι(R)=(w, h), circle ι(C)=r and triangle ι(T)=(w, h).

When regions change in motion along passage of time, regions may become dynamic (or motion) regions. Thus, a dynamic (or motion) region is a sequence R(t) of regions that are time dependent. In a discrete time, a dynamic region may be expressed in an absolute form as follows:

$$R(t), R(t+1), \ldots$$

Alternatively, a dynamic region may be expressed in the incremental form as follows:

$$R(t), R(t+1) = R(t) + \delta R(t), \ldots$$

A dynamic region may provide a video (a sequence of images, views or scenes), thereby reflecting the media content captured or observed when the region changes its location and possibly shape.

When a dynamic region R(t) does not change in some of its dimensions (e.g., location and shape), the representation of the dynamic region may be simplified. For instance, in ROI (region of interest) video applications, region changes usually involve changes in the location (x, y), and do not involve changes in the shape. In such cases, a dynamic region R(t) may be represented in a simplified form, with an initial region, $R(0)=R0=(\lambda 0, \iota 0)$, and a sequence of changes $\delta\lambda(t)$, $t=1, 2, \ldots$ and so on.

In the present disclosure, a tile is a special type of region with rectangular shape, and a dynamic tile is a tile moving around on a 2D plane.

Geometric Type of Viewports

In the context of a cluster of viewports generated from multiport media sources, the viewports may be collectively arranged in some geometric shape. FIG. 6 illustrates some example types of geometric shapes in which viewports may be formed. Other examples, not shown in FIG. 6, may include squished sphere, platonic solids (with 4, 8 and 20 surfaces), truncated pyramid, segmented sphere and directed fisheyes for 3D viewports, polygons (with different number of edges) and rectangular mesh (of size w by h) for 2D viewports.

It is noteworthy that a cluster of viewports may have its own internal multi-level structures. For instance, a cluster may be divided into multiple sub-clusters. While each sub-cluster may have its own geometric shape, the sub-clusters, each of which considered as a "big" viewport, may collectively have a cluster level geometric shape, and the cluster shape and sub-cluster shapes may be different. For simplicity, the present disclosure focuses on a single geometric shape formed by all the viewports within a cluster.

Projection and Mapping Methods

Figure 7:
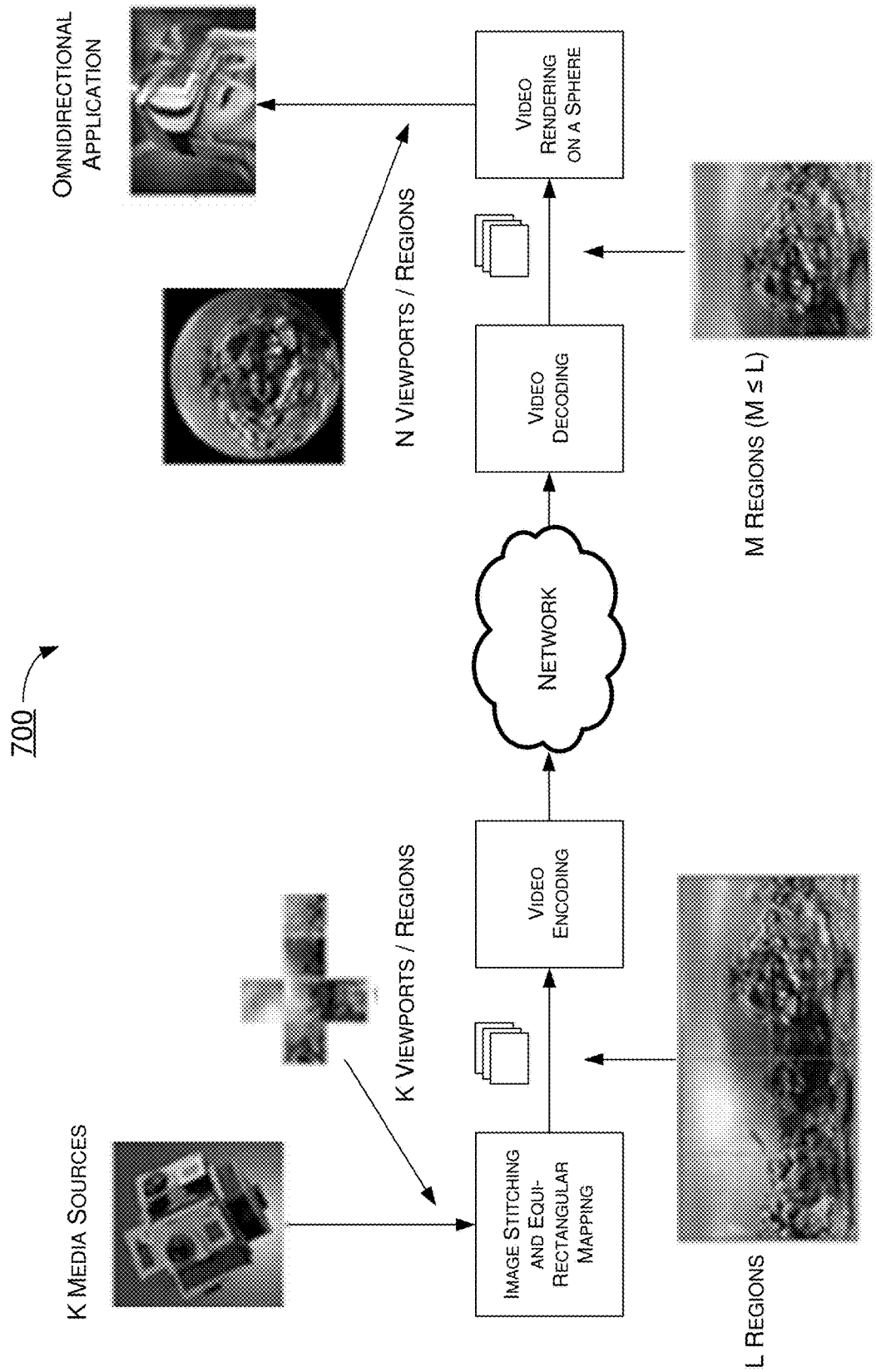
FIG. 7 is a diagram of an example process in accordance with the present disclosure.

For VR, FVT (Free Viewpoint Television) and other related applications, viewports or regions of captured media content (e.g., video) from media sources need to be projected and mapped (e.g., via stitching) onto a 2D plane, prior to encoding. In order to render required viewports or regions, encoded versions of some mapped regions may be delivered and then decoded, rendered and presented. FIG. 7 illustrates an example process 700 in accordance with the present disclosure.

For a cluster of K media sources with a geometric arrangement in the 3D space, $S_0, \ldots, S_{K-1}$, projections and mappings may be defined as follows:

For a projection is a function P: $(V_0, \ldots, V_{K-1}) \to (R_0, \ldots, R_{K-1})$ For a mapping is a function M: $(R_0, \ldots, R_{K-1}) \to (R'_0, \ldots, R'_{L-1})$ For a reverse mapping is a function M−1: $(R'_0, \ldots, R'_{M-1}) \to (R_0, \ldots, R_{N-1})$ For a reverse projection is a P−1 function: $(R_0, \ldots, R_{N-1}) \to (V_0, \ldots, V_{N-1})$ Some common examples of above-listed functions in VR and FVT related applications include, for example and without limitation, equirectangular projection and mapping for spherical viewports (ERP), cube projection and mapping for cubic square viewports (CMP), and ring projection and mapping for rectangular regions (RMP). Each of these examples is described below.

ERP is a common projection and mapping in 360° video, whose result of composing its projection and mapping is shown in part (A) of FIG. 8. In the case of ERP, source viewports may be described as spherical ones with latitude and longitude sizes viewed from the center (x, y, z)=(0, 0, 0) of the sphere without any rolling θz=0, as follows:

$$V=(\tau,\rho,\iota) \text{ with } \tau=(0,0,0), \rho=(\theta_x,\theta_y,0), \iota(R)=(\delta\theta_x,\delta\theta_y),$$

The projected and mapped regions are of rectangular shape without any rotation θ=0, as follows:

$$R=(\lambda,\iota) \text{ with } \lambda=(x,y), \iota=\iota(R)=(w,h)$$

$$R'=(\lambda',\iota') \text{ with } \lambda'=(x',y'), \iota'=\iota'(R)=(w',h').$$

Part (B) of FIG. 8 shows an example of projected and mapped regions in ERP. The projection, mapping, reverse mapping and reverse projection functions, P, M, $M_r$, and $P_r$, may be given as shown in Table 5 below.

TABLE 5

Projection and Mapping Functions in ERP

| Projection | Viewport $V_i = (\tau, \rho, \iota)$ | Region $R_i = (\lambda, \iota)$ |
|---|---|---|
| $P(V_0, \ldots, V_{K-1}) = (R_0, \ldots, R_{K-1})$ | $\tau = (0, 0, 0), \rho = (\theta_x, \theta_y, 0), \iota^{(R)} = (\delta\theta_x, \delta\theta_y)$ | $\lambda = (x, y), \iota = \iota^{(R)} = (w, h)$ with $x = \theta_x, y = \theta_y, w = \delta\theta_x, h = \delta\theta_y$ |
| Mapping (with factors $c_x$ and $c_y$) | Region $R_i = (\lambda, \iota)$ | Region $R'_i = (\lambda', \iota')$ |
| $M(R_0, \ldots, R_{K-1}) = (R'_0, \ldots, R'_{K-1})$ | $\lambda = (x, y)$, $\iota = (w, h)$ | $\lambda' = (x', y') = (c_x * x, c_y * y)$, $\iota' = (w', h') = (c_x * w, c_y * h)$ |
| Reverse Mapping (with $c_x$, $c_y$) | Region $R'_i = (\lambda', \iota')$ | Region $R_i = (\lambda, \iota)$ |
| $M^{-1}(R'_0, \ldots, R'_{M-1}) = (R_0, \ldots, R_{M-1})$ | $\lambda' = (x', y')$, $\iota' = (w', h')$ | $\lambda = (x, y) = (x'/c_x, y'/c_y)$, $\iota = (w, h) = (w'/c_x, h'/c_y)$ |
| Reverse Projection | Region $R_i = (\lambda, \iota)$ | Viewport $V_i = (\tau, \rho, \iota)$ |
| $P^{-1}(R_0, \ldots, R_{K-1}) = (V_0, \ldots, V_{K-1})$ | $\lambda = (x, y)$, $\iota = (w, h)$ | $\tau = (0, 0, 0), \rho = (\theta_x, \theta_y, 0) = (x, y, 0), \iota^{(R)} = (\delta\theta_x, \delta\theta_y)$ |

It is noteworthy that the mapping and reverse mapping are parameterized by two factors, $c_x$ and $c_y$, for scaling the size of the entire 2D area. Moreover, there are a large number of projections of the sphere available, some of which are better in minimizing different kinds of distortion (e.g., area, direction and distance), but with higher computational complexity in calculating the projections, mappings and their inverse functions, such as the Winkel triple projection for example.

In CMP, projecting and mapping viewports on the six faces of a cube rely on how the faces are arranged on a 2D plane. Part (A) of FIG. 9 shows one example of CMP. Referring to part (A) of FIG. 9, since the top face (2) and bottom face (3) are not adjacent, this may not be the most efficient in coding. Since projection and mapping functions are defined as separate ones, the six faces may be rearranged for the purpose of achieving better coding efficiency. Part (B) of FIG. 9 shows another way to arrange the faces. Using this arrangement, source viewports can be described as the cubic rectangular ones viewed from the center (x, y, z)=(0, 0, 0) of the cube without any rolling $\theta_z=0$, as follows:

$$V=(\tau,\rho,\iota) \text{ with } \tau=(0,0,0), \rho=(\theta_x,\theta_y,0), \iota=\iota(S)=d$$

Here, $\theta x=0°$, $\pm 90°$ and $180°$, $\theta y=0°$, $\pm 90°$, and d denotes the size of cube. Projected and mapped regions are of rectangular shape without any rotation $\theta=0$, as follows:

$$R_i=(\lambda_i,\iota_i) \text{ with } \lambda_i=(x_i,y_i), \iota_i=d$$

$$R_i'=(\lambda_i',\iota_i') \text{ with } \lambda_i'=(x_i',y_i'), \iota_i'=(w',h')$$

The projection, mapping, reverse mapping and reverse projection functions, P, M, $M_r$ and $P_r$, may be given as shown in Table 6 below.

It is noteworthy that the mapping and reverse mapping are parameterized by two factors, $c_x$ and $c_y$, for scaling the size of the entire 2D area. Moreover, there are media source arrangements in other platonic solids of different number of surfaces and other kinds of solids such as, for example, icosahedral, octahedron and truncated square pyramid. For such other solids, their viewports $V_i$, projected regions $R_j$, mapped regions R'k, projections P, mappings M, reverse mappings $M^{-1}$, and reverse projections $P^{-1}$, may be defined in a manner similar to the ones of the cube, where the locations and sizes of viewports and regions of the surface shapes need to be defined in detail.

Figure 10:
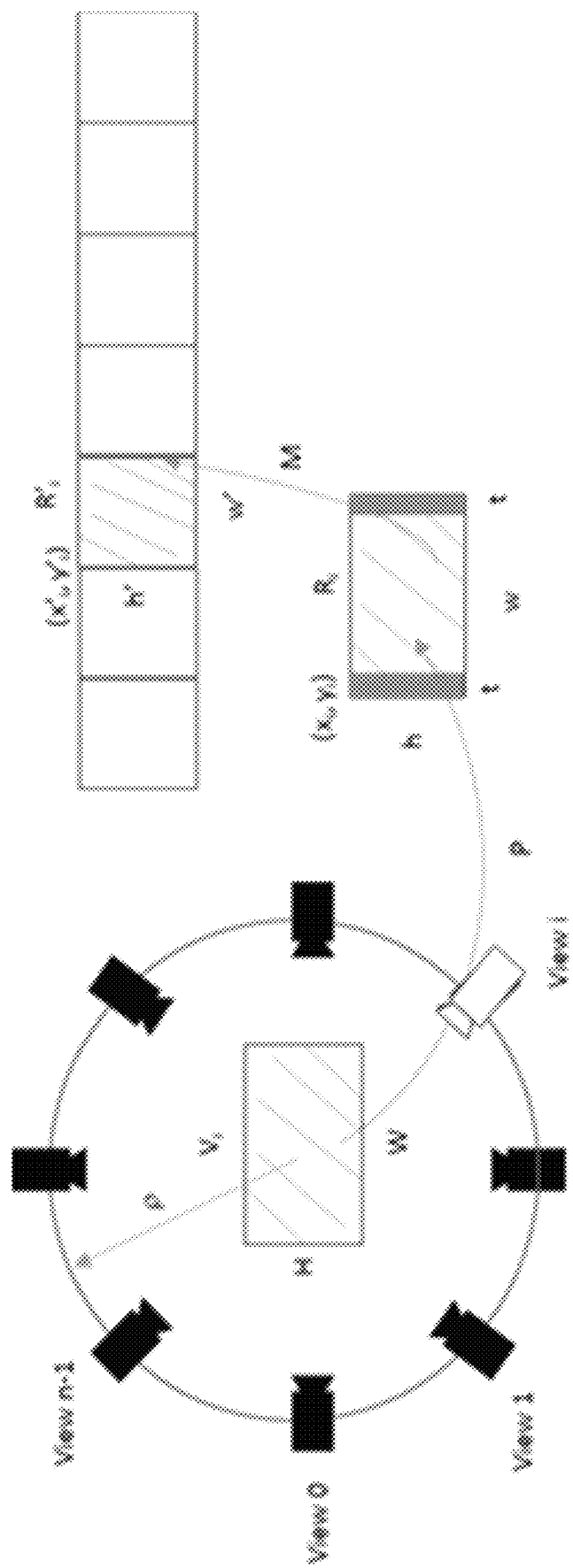
FIG. 10 is a diagram of example ring projection and mapping for rectangular regions in accordance with the present disclosure.

With respect to RMP, FIG. 10 shows an example with regions involving overlap elimination (during projection) and stitching (during mapping). In the example shown in FIG. 10, there are a number of n 2D viewports arranged in a 2D ring of radius ρ, each of which positioned at ($x_i$, $y_i$) with a rotation $\theta_i = i*360/n$ toward the center of the ring, with a rectangular view shape of size (W, H), as follows:

$$V_i=(\tau_i,\rho_i,\iota_i) \text{ with } \tau_i=(x_i,y_i), \rho=\theta_i, \iota=\iota^{(S)}=(W,H)$$

The projected and mapped regions are of rectangular shape, as follows:

$$R_i=(\lambda_i,\iota_i) \text{ with } \lambda_i=(x_i,y_i), \iota_i=(w,h)$$

$$R_i'=(\lambda_i',\iota_i') \text{ with } \lambda_i'=(x_i',y_i'), \tau_i'=(w',h')$$

The projection, mapping, reverse mapping and reverse projection functions, P, M, $M^{-1}$ and $P^{-1}$, may be given as shown in Table 7 below.

TABLE 6

Projection and Mapping Functions in CMP

| Projection | Viewport $V_i = (\tau_i, \rho_i, \iota_i)$ | Region $R_i = (\lambda_i, \iota_i)$ |
|---|---|---|
| $P(V_0, \ldots, V_5) = (R_0, \ldots, R_5)$ | $\tau_i = (0, 0, 0)$<br>$\rho_0 = (0, 0, 0)$<br>$\rho_1 = (0, 90, 0)$<br>$\rho_2 = (0, -90, 0)$<br>$\rho_3 = (90, 0, 0)$<br>$\rho_4 = (-90, 0, 0)$<br>$\rho_5 = (180, 0, 0)$<br>$\iota_i = d$ | $\lambda_i = (x_i, y_i), \iota_i = d$ with<br>$x_0 = 0, y_0 = 3 * d$<br>$x_1 = 0, y_1 = 2 * d$<br>$x_2 = 2 * d, y_2 = 2 * d$<br>$x_3 = 2 * d, y_3 = 2 * d$<br>$x_4 = 2 * d, y_4 = 2 * d$<br>$x_5 = 0, y_5 = d$ |
| Mapping (with factors $c_x$ and $c_y$) | Region $R_i = (\lambda_i, \iota_i)$ | Region $R'_i = (\lambda'_i, \iota'_i)$ |
| $M(R_0, \ldots, R_5) = (R'_0, \ldots, R'_5)$ | $\lambda_i = (x_i, y_i)$<br>$\iota_i = d$ | $\lambda'_i = (x'_i, y'_i, 0) = (c_x * x_i, c_y * y_i)$,<br>$\iota'_i = (w', h') = (c_x * d, c_y * d)$ |
| Reverse Mapping (with $c_x$, $c_y$) | Region $R'_i = (\lambda'_i, \iota'_i)$ | Region $R_i = (\lambda_i, \iota_i)$ |
| $M^{-1}(R'_0, \ldots, R'_5) = (R_0, \ldots, R_5)$ | $\lambda'_i = (x'_i, y'_i)$<br>$\iota'_i = (w', h')$ | $\lambda_i = (x_i, y_i) = (x'_i/c_x, y'_i/c_y)$,<br>$\iota_i = d = w'/c_x = h'/c_y$ |
| Reverse Projection | Region $R_i = (\lambda_i, \iota_i)$ | Viewport $V_i = (\tau_i, \rho_i, \iota_i)$ |
| $P^{-1}(R_0, \ldots, R_5) = (V_0, \ldots, V_5)$ | $\lambda_i = (x_i, y_i)$<br>$\iota_i = d$ | $\tau_i = (0, 0, 0)$<br>$\rho_0 = (0, 0, 0)$<br>$\rho_1 = (0, 90, 0)$<br>$\rho_2 = (0, -90, 0)$<br>$\rho_3 = (90, 0, 0)$<br>$\rho_4 = (-90, 0, 0)$<br>$\rho_5 = (180, 0, 0)$<br>$\iota_i = d$ |

TABLE 7

Projection and Mapping Functions in RMP

| Projection | Viewport $V_i = (\lambda_i, \iota_i)$ | Region $R_i = (\lambda_i, \iota_i)$ |
|---|---|---|
| $P(V_0, \ldots, V_{K-1}) = (R_0, \ldots, R_{K-1})$ | $\lambda_i = (x_i, y_i, \theta_i) =$ <br> $(\rho * \cos(\theta_i + 180),$ <br> $\rho * \sin(\theta_i + 180))$, with $\theta_i =$ <br> $i * 360/n$ <br> $\iota_i = (W, H)$ | $\lambda_i = (i * W * (1 - 2 * t), H),$ <br> $\iota_i = (w, h) = (W * (1 - 2 * t),$ <br> $H),$ <br> with t as the overlapping <br> ratio removed on each <br> side |
| Mapping (with factors $c_x$ and $c_y$) | Region $R_i = (\lambda_i, \iota_i)$ | Region $R'_i = (\lambda'_i, \iota'_i)$ |
| $M(R_0, \ldots, R_{K-1}) = (R'_0, \ldots, R'_{K-1})$ | $\lambda_i = (x_i, y_i)$ <br> $\iota_i = (w, h)$ | $\lambda'_i = (x'_i, y'_i, 0) = (c_x * x_i,$ <br> $c_y * y_i),$ <br> $\iota'_i = (w', h') = ((1 - t) * c_x * w,$ <br> $(1 - t) * c_y * h)$ |
| Reverse Mapping (with $c_x$, $c_y$) | Region $R'_i = (\lambda'_i, \iota'_i)$ | Region $R_i = (\lambda_i, \iota_i)$ |
| $M^{-1}(R'_0, \ldots, R'_{M-1}) = (R_0, \ldots, R_{M-1})$ | $\lambda'_i = (x'_i, y'_i)$ <br> $\iota'_i = (w', h')$ | $\lambda_i = (x_i, y_i, 0) = (x'_i/c_x, y'_i/c_y),$ <br> $\iota_i = (w, h) = (w'/c_x/(1 - t),$ <br> $h'/c_y/(1 - t))$ |
| Reverse Projection | Region $R_i = (\lambda_i, \iota_i)$ | Viewport $V_i = (\lambda_i, \iota)$ |
| $P^{-1}(R_0, \ldots, R_{K-1}) = (V_0, \ldots, V_{K-1})$ | $\lambda_i = (x_i, y_i)$ <br> $\iota_i = (w, h)$ | $\lambda_i = (\rho * \cos(\theta_i + 180),$ <br> $\rho * \sin(\theta_i + 180)), \theta_i =$ <br> $i * 360/n$ <br> $\iota = (W, H) = (w * (1 + 2 * t), h)$ |

It is noteworthy that the projection and reverse projection are parametrized by one overlapping ratio factor t, for removing overlapping areas with their neighboring regions on each side. The mapping and reverse mapping are parameterized by two factors, $c_x$ and $c_y$, for scaling the size of the entire 2D area. Moreover, this kind of projection and mapping may be applied to arrangements of cameras such as camera arrays in rectangular shapes and multiple layered camera arrays of circular and rectangular shapes (mapped to 2D areas with multiple rows).

CICP for Multiple Video Sources

In accordance with the present disclosure, coding-independent code points may be defined for a cluster of media sources. Although emphasis is placed on video sources in the following description, the schemes and concepts may be applied to other types of media sources.

For clusters, a number of CICPs may be defined. Example definitions are provided below.

The CICP of ClusterID may be defined as follows:
Name: ClusterID
Type: String
Range: None The CICP of ClusterID may indicate an identification value of a cluster of related media sources, according to some identification system.

The CICP of ClusterSize may be defined as follows:
Name: ClusterSize
Type: Unsigned integer
Range: None The CICP of ClusterSize may indicate the size of a cluster of related media sources.

The CICP of ClusterPositionIndex may be defined as follows:
Name: ClusterPositionIndex
Type: Unsigned integer, enumeration
Range: 0 to ClusterSize−1

The CICP of ClusterPositionIndex may indicate a position index of a media source within a cluster of related media sources. Its value is less than the value of ClusterSize.

The CICP of ClusterGeometryType may be defined as follows:

Name: ClusterGeometryType
Type: Unsigned integer, enumeration
Range: 0-255

The CICP of ClusterGeometryType may indicate the type of a geometric arrangement of related media sources within a cluster in the 3D or 2D space.

FIG. 11 shows a table of example cluster geometry types. It is noteworthy that this table can be expanded, modified or reordered, as needed. For instance, 3D geometry types such as squished sphere, platonic solids (with 4, 8 and 20 surfaces), truncated pyramid, segmented sphere and directed fisheyes, and 2D geometry types such as polygons (with different number of edges) and rectangular mesh (of size w by h) may be added into the table as needed. Moreover, nested versions of any geometry types, such as nested sphere or ring (a sequence of spheres or rings with a same center but different radiuses), nested cubes, nested rectangles (a sequence of rectangles with a same center and proportional sizes) may also be candidates for addition into the able.

The CICP of CubeSurfaceID may be defined as follows:
Name: CubeSurfaceID
Type: Unsigned integer, enumeration
Range: 0-15

The CICP of CubeSurfaceID may indicate a nominal identification value of a surface of the cube geometry type of a cluster of related media sources. Example values of CubeSurfaceID are shown in Table 8 below.

TABLE 8

| CubeSurfaceID | |
|---|---|
| Value | Cube Surface Name |
| 0 | Reserved |
| 1 | Front |
| 2 | Top |
| 3 | Bottom |
| 4 | Left |
| 5 | Right |
| 6 | Back |
| 7-15 | Reserved |

The CICP of CylinderSurfaceID may be defined as follows:
Name: CylinderSurfaceID
Type: Unsigned integer, enumeration
Range: 0-15
The CICP of CylinderSurfaceID may indicate a nominal identification value of a surface of the cylinder geometry type of a cluster of related media sources. Example values of CylinderSurfaceID are shown in Table 9 below.

TABLE 9

| CylinderSurfaceID | |
|---|---|
| Value | Cylinder Surface Name |
| 0 | Reserved |
| 1 | Top |
| 2 | Bottom |
| 3 | Side |
| 4-15 | Reserved |

It is noteworthy that additional attributes may be introduced for other cluster geometry types whose surfaces need to be nominally identified. Examples include platonic solids, truncated pyramid, and segmented sphere.

For translations and rotations of viewports, a number of CICPs may be defined. Example definitions are provided below.

The CICPs of ViewportPositionX, ViewportPositionY, and ViewportPositionZ may be defined as follows:
Name: Vie wportPositionX, ViewportPositionY, ViewportPositionZ
Type: fixed-point or integer
Range: None The CICPs of ViewportPositionX, ViewportPositionY and ViewportPositionZ may indicate coordinates on the X-axis, Y-axis and Z-axis, respectively, of a viewport, with respect to a reference coordinate system.

The CICPs of ViewportRotationPitch, ViewportRotationYaw, ViewportRotationRoll, and ViewportRotation may be defined as follows:
Name: ViewportRotationPitch, ViewportRotationYaw, ViewportRotationRoll, ViewportRotation
Type: fixed-point or integer
Range: [−180, 180] or [0, 360]

The CICPs of ViewportOrientationPitch, ViewportOrientationYaw, ViewportOrientationRoll, and ViewportRotation may indicate pitch, yaw and roll rotations in 3D and 2D, respectively, of a viewport, with respect to a reference coordinate system.

The CICPs of RegionLocationX and RegionLocationY may be defined as follows:
Name: RegionLocationX, RegionLocationY
Type: fixed-point or integer
Range: None The CICPs of RegionLocationX and RegionLocationY may indicate coordinates on the X-axis and Y-axis, respectively, of a region, with respect to a reference coordinate system.

The CICP of RegionBasePoint may be defined as follows:
Name: RegionBasePoint
Type: unsigned integer, enumeration
Range: 0 to 15

The CICP of RegionBasePoint may indicate a type of reference point on the region where the coordinates RegionLocationX and RegionLocationY are, with respect to a reference coordinate system. Example values of RegionBasePoint are shown in Table 10 below.

TABLE 10

| RegionBasePoint | |
|---|---|
| Value | Region Base Point |
| 0 | reserved |
| 1 | center |
| 2 | top-left corner |
| 3 | bottom-left corner |
| 4 | top-right corner |
| 5 | bottom-right corner |
| 6-15 | reserved |

The CICP of RegionOverlappingRatio may be defined as follows:
Name: RegionOverlappingRatio
Type: unsigned integer, enumeration
Range: 0 to 255

The CICP of RegionOverlappingRatio may indicate a ratio of a region overlapping with each of its neighboring regions, when they are stitched together. Example values of RegionOverlappingRatio are shown in Table 11 below.

| Value | Overlapping Ratio |
|---|---|
| 0 | 0% |
| 1 | 0.1% |
| 2 | 0.2% |
| 3 | 0.3% |
| 4 | 0.4% |
| 5 | 0.5% |
| 6 | 0.6% |
| ... | ... |
| 255 | 25.5% |

For views of viewports and regions, one or more CICPs may be defined. Example definitions are provided below.

The CICP of ViewCharateristics may be defined as follows:
Name: ViewCharateristics
Type: Unsigned integer, enumeration
Range: 0-15

The CICP of ViewCharateristics may indicate the shape and size of a view. FIG. 12 shows a table of example view characteristics. Example view characteristics listed in the table include rectangle, square, circle and triangle. It is noteworthy that other shapes (e.g., polygon, ellipse and oval) and their sizes may be added into the table as needed.

For projections and mappings, a number of CICPs may be defined. Example definitions are provided below.

The CICP of ProjectionType may be defined as follows:
Name: ProjectionType
Type: Unsigned integer, enumeration
Range: 0-255

The CICP of ProjectionType may indicate the type of a projection of a list of viewports onto another list of regions. FIG. 13 shows a table of example projection types. Example projection types listed in the table include sphere unfolding, cube unfolding and ring unfolding.

The CICP of MappingType may be defined as follows:
Name: MappingType
Type: Unsigned integer, enumeration
Range: 0-255

The CICP of MappingType may indicate the type of a mapping of a list of regions onto another list of regions. FIG. 14 shows a table of example mapping types. Example mapping types listed in the table include array tiling, T tiling and line tiling.

The CICP of ReverseMappingType may be defined as follows:
Name: ReverseMappingType
Type: Unsigned integer, enumeration
Range: 0-255

The CICP of ReverseMappingType may indicate the type of a reverse mapping of a list of regions onto another list of regions. FIG. 15 shows a table of example reverse mapping types. Example reverse mapping types listed in the table include array de-tiling, T de-tiling and line de-tiling.

The CICP of ReverseProjectionType may be defined as follows:
Name: ReverseProjectionType
Type: Unsigned integer, enumeration
Range: 0-255

The CICP of ReverseProjectionType may indicate the type of a reverse projection of a list of regions onto another list of viewports. FIG. 16 shows a table of example reverse projection types. Example reverse projection types listed in the table include sphere forming, cube forming and ring forming.

CICP Profiles

Many applications involving multiple media sources have restrictions on some of the degrees of freedoms in the 3D or 2D spaces. As their viewports and regions may have specific shapes, consequently their projections and mappings may have special forms. Therefore, it is convenient to define profiles for specific types of applications on the coding-independent code points, tailored for those applications. In some implementations, CICP profiling items may include, for example and without limitation, geometry type of multiple media sources, geometry surface identification, translations and rotations of viewports, locations of regions, views of viewports and regions, projections, mappings, reverse mappings, and reverse projections. These example CICP profiling items are listed below.

1. Geometry Type of multiple media sources: existing ones and extended ones in Table of ClusterGeometryType.
2. Geometry Surface Identification: existing or extended nominal identification of surfaces of the geometry type profiled, if needed.
3. Translations and Rotations of Viewports:
   a. restrictions on the number of viewport positions (ViewportPositionX, ViewportPositionY and ViewportPositionZ) and their ranges
   b. restrictions on the number of orientations (ViewportOrientationPitch, ViewportOrientationYaw, ViewportOrientationRoll, ViewportOrientation) and their ranges
4. Locations of Regions:
   c. restrictions on the number of positions (RegionLocationX and RegionLocationY) and their ranges
   d. restrictions on the orientation (RegionBasePoint)
   e. restriction on RegionOverlappingRatio
5. Views of Viewports and Regions: existing ones and extended ones in Table of ViewCharateristics, regarding view shapes and sizes.
6. Projections: existing ones and extended ones in Table of ProjectionType.
7. Mappings: existing ones and extended ones in Table of MappingType.
8. Reverse Mappings: existing ones and extended ones in Table of ReverseMappingType.
9. Reverse Projections: existing ones and extended ones in Table of Reverse ProjectionType.

For illustrative purposes, VR profiles and FVT profiles are described below.

As an example, a spherical (360° or 180°) VR profile in ERP may have a number of restrictions as listed below.
1. ClusterGeometryType=1 (sphere)
2. No surface identification
3. Translations and Rotations of Viewports: $V=(\tau, \rho, \iota)$ with $\tau=(x_0, y_0, z_0)$, $\rho=(\theta_x, \theta_y, 0)$
   a. ViewportPositionX=$x_0$, ViewportPositionY=$y_0$ and ViewportPositionZ=$z_0$. This means that viewport positions are fixed to a particular point in a reference coordinate system, and viewports do not move and change their positions.
   b. ViewportRotationRoll=0. This means that viewports has no rolling rotation. For 180° Spherical VR, the ranges of ViewportRotationPitch, and ViewportRotationYaw, are restricted to [0, 180) or (−90, 90]
4. Locations of Regions: $R=(\lambda, \iota)$ with $\lambda=(x, y)$
   a. RegionBasePoint=1. This means that region's base point is at the center of the region
   b. RegionOverlappingRatio=0. This means that regions have no overlapping with their neighboring ones
5. Views of Viewports and Regions: ViewCharateristics=1 (rectangular)
6. Projections: ProjectionType=1 (sphere unfolding)
7. Mappings: MappingType=1 (array tiling)
8. Reverse Mappings: ReverseMappingType=1 (array detiling)
9. Reverse Projections: ReverseProjectionType=1 (sphere forming)

As another example, a cubic VR profile in CMP may have a number of restrictions as listed below.
1. ClusterGeometryType=2 (cube)
2. CubeSurfaceID is selected
3. Translations and Rotations of Viewports: $V=(\tau, \rho, \iota)$ with $\tau=(x_0, y_0, z_0)$, $\rho=(\theta_x, \theta_y, 0)$
   a. ViewportPositionX=$x_0$, ViewportPositionY=$y_0$ and ViewportPositionZ=$z_0$. This means that viewport positions are fixed to a particular point in a reference coordinate system, and viewports do not move and change their positions.
   b. ViewportRotationRoll=0. This means that viewports has no rolling rotation.
4. Locations of Regions: $R=(\lambda, \iota)$ with $\lambda=(x, y)$
   a. RegionBasePoint=1. This means that region's base point is at the top-left corner of the region
   b. RegionOverlappingRatio=0. This means that regions have no overlapping with their neighboring ones
5. Views of Viewports and Regions: ViewCharacteristics=2 (square)
6. Projections: ProjectionType=2 (cube unfolding)
7. Mappings: MappingType=2 (t tiling)
8. Reverse Mappings: ReverseMappingType=2 (t detiling)

9. Reverse Projections: ReverseProjectionType=2 (cube forming)

As yet another example, a FTV profile in RMP for the ring arrangement of cameras may have a number of restrictions as listed below.

1. ClusterGeometryType=201 (ring).
2. No surface identification.
3. Translations and Rotations of Viewports (2-dimensional): $V_i=(\tau_i, \rho_i, \iota_i)$ with $\tau_i=(x_i, y_i)$, $\rho=\theta_i$
   a. None.
4. Locations of Regions: $R=(\lambda, \iota)$ with $X=(x, y)$
   b. RegionBasePoint=1. This means that region's base point is at the top-left corner of the region
5. Views of Viewports and Regions: ViewCharateristics=1 (rectangular)
6. Projections: ProjectionType=201 (ring unfolding)
7. Mappings: MappingType=201 (line tiling)
8. Reverse Mappings: ReverseMappingType=201 (line detiling)
9. Reverse Projections: ReverseProjectionType=201 (ring forming).

Canonicalization Process

In omnidirectional media applications using omnidirectional (e.g., 360° VR) media contents, omnidirectional image or video is typically captured using multiple cameras and is then aligned, stitched together, projected onto one or more 2D planes according to a particular projection, and mapped onto a frame according to a particular mapping. The image or video frames are then encoded and delivered, and the delivered frames are decoded on the receiver side, with a specific view extracted and displayed (e.g., in a head-mounted device (HMD) or some other display device). Depending on geometric arrangements of source cameras, different projections and mappings may be used to prepare image or video frames for encoding and delivery. Common geometric types include, for example, sphere, cube, icosahedron, squished sphere, cylinder, platonic solid of four, eight and twelve faces, truncated pyramid, segmented sphere and direct fisheye.

A major issue in dealing with the many different types of projected and mapped image or video frames arises when attempting to construct viewports for rendering that are requested in response to user-selected viewports due to user interaction, such as movements of a user's head. It requires that sophisticated information be provided for the frames within encapsulation mechanisms for delivery such as storage files and streaming manifests, and different view construction algorithms be implemented on the receiver side for identifying relevant frame regions and reconstructing requested viewports. This issue becomes more severe when projected and mapped images or videos are divided into tiles to be encoded, transcoded into different qualities and delivered separately, especially for efficient dynamic adaptive streaming and fast response to user-selected viewports.

In view of the above, the present disclosure proposes methods and systems to canonicalize delivery and reconstruction of omnidirectional content, to implement more efficient omnidirectional media applications with enhanced user experience and lower implementation complexity. The proposed methods and systems transform, via canonicalization, source content obtained from cameras and arranged in other geometric types onto a sphere first, and then process the canonicalized content using conventional and new content flow process for the spherical content.

The reason for choosing sphere as the target geometric type onto which to transform other types is that there are many well-studied projection and mapping methods for sphere, and its equirectangular projection and mapping is common and simple to implement, in terms of signaling and rendering. Besides, sphere is very friendly to multi-region (or multi-tile) delivery and reconstruction of user-selected views, due to the continuity preservation in the neighboring relationship of spherical viewports and mapped regions—which is in contrast with projections and mappings of viewports of other geometric types that often result in region neighborhood discontinuity. Moreover, what get to be displayed to a user are user-selected viewports, in response to user's head movements, in many cases image or video frames on the sphere. When dealing with decoded non-spherically projected and mapped image or video frames, it is the receiver (or client) that needs to construct the spherical viewports based on the non-spherical ones. This implies that there would be some transformation from non-spherical viewports onto spherical viewports, from which the user-selected spherical ones are constructed. Therefore, if the transformation from non-spherical viewports to corresponding spherical viewports is implemented prior to encoding, the entire content flow process from encoding onward may be canonicalized and made much more efficient and easier to implement and even be standardized.

Figure 17:
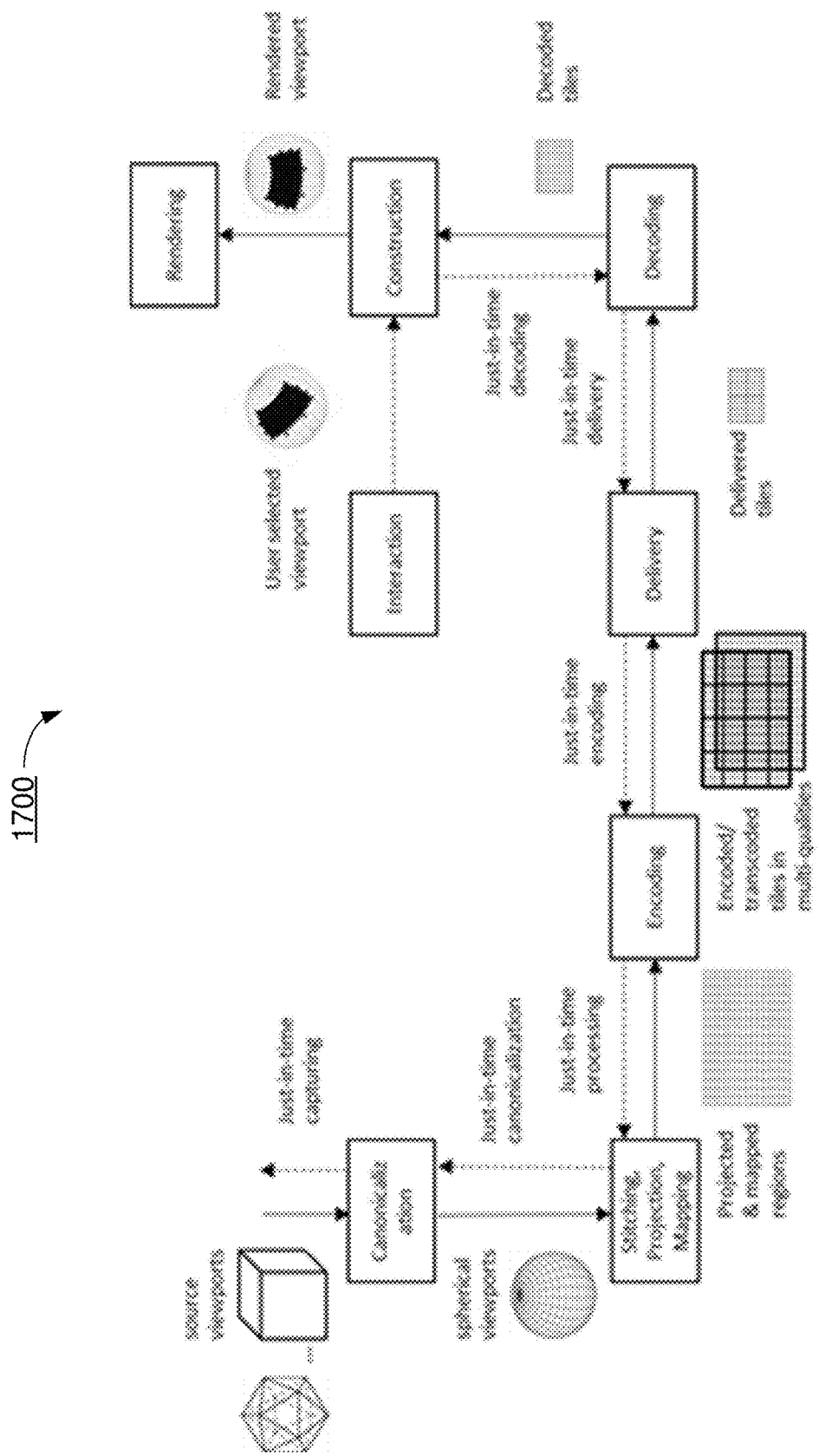
FIG. 17 is a diagram of a new content flow process with a canonicalization process in accordance with the present disclosure.

In accordance with the present disclosure, a proposed canonicalization process is introduced before the process of "image stitching, projection, and mapping." The proposed canonicalization process may transform non-spherical viewports captured from media sources onto a cluster, a set or a collection of spherical viewports. FIG. 17 illustrates a new content flow process 1700 with a canonicalization process in accordance with the present disclosure. Referring to FIG. 17, content flow process 1700 takes into consideration potential partial processing and just-in-time processing (e.g., to support dynamic adaptive delivery and user interaction-based on-demand processing). In content flow process 1700, after canonicalization, the source viewports may not need to cover the entire sphere (e.g., as there is no top face viewport on a cube). This makes it possible that just-in-time capture may be invoked (e.g., turning a camera to look up straightly, or turning on a camera that looks up straightly), if a user-selected viewport (e.g., looking up straightly) cannot be constructed based on the existing source viewports. More generally, all the stage processes may not need to process all the available input image or video data, and may be partially or even totally driven by on-demand requests from a user's selection of viewports. This may result in possible partial processing of decoding, delivery, encoding/transcoding, projection/mapping, canonicalizing and capturing of necessary tiles for constructing user-selected viewports. This may also result in possible just-in-time processing for generating required but missing decoded, delivered and encoded/transcoded tiles, projected/mapped regions, and canonicalized and captured viewports.

With content flow process 1700, one area of focus may be handling of spherical viewports from "stitching, projection, mapping" onward, and another area of focus may be canonicalization of viewports of other geometric types onto spherical ones. There are a large number of well-studied projections of the sphere. Some of the projections tend to be computationally efficient but incur observable transform distortions on area, direction and distance, such as the equirectangular projection. Some other projections tend to be better in minimizing different kinds of distortion in terms of area, direction and distance, but may require higher computational complexity in calculating the projections, mappings and their inverse functions, such as the Winkel tripel projection for example.

In general, the proposed canonicalization process may be feasible for non-spherical viewports, even with a conventional (non-canonicalized) content flow process. The proposed canonicalization process may be considered as a composition of the processes of "stitching, projection, mapping" and "construction." For each non-sphere type, the proposed canonicalization process may be implemented using a number of transformation algorithms, depending on a variety of criteria (e.g., area, direction and distance distortions), in addition to computational complexity and impact on coding compression efficiencies.

For viewports of a non-spherical type that has a well-defined center (or origin), a simplest and straightforward canonicalization may be to normalize or scale all the points (or "vectors") on the viewports onto a sphere with the same center (or origin). That is, for any point (x, y, z) on one of the viewports, the canonicalization transformation may involve calculating a corresponding azimuth and inclination angles ($\theta_x$, $\theta_y$) from the center, as follows:

$$\theta_x = \arccos\left(\frac{y}{x}\right)$$
$$\theta_y = \arccos\left(\frac{z}{\sqrt{x^2 + y^2 + z^2}}\right)$$

The point may then be mapped on the sphere with the angles ($\theta_x$, $\theta_y$). In an event that there are more than one points on the viewports that have the same angles ($\theta_x$, $\theta_y$), a corresponding spherical point may take a point value that is an average or a weighted average of values of those non-spherical viewports. It is noteworthy that, although simple and straightforward, this kind of normalization or scaling may not be ideal in avoiding distortions. For instance, when applying the normalization to face viewports on a cube (with |x|=d/2, |y|=d/2 or |z|=d/2), a result may be points concentrated on the sphere that correspond to those at the corners of the cube.

As improvement of the normalization transformation, an example transformation below for canonicalizing cubic viewports may spread out points around the corners of the cube more evenly. Specifically, for any point (x, y, z) on a face viewport of the cubic geometry type, a corresponding transformed point on the sphere is (x', y', z'), as follows:

$$\begin{bmatrix} x' \\ y' \\ z' \end{bmatrix} = \begin{bmatrix} x\sqrt{1 - \frac{y^2}{2} - \frac{z^2}{2} + \frac{y^2 z^2}{3}} \\ y\sqrt{1 - \frac{z^2}{2} - \frac{x^2}{2} + \frac{z^2 x^2}{3}} \\ z\sqrt{1 - \frac{x^2}{2} - \frac{y^2}{2} + \frac{x^2 y^2}{3}} \end{bmatrix}$$

The corresponding transformed point on the sphere has azimuth and inclination angles ($\theta_x'$, $\theta_y'$), as follows:

$$\begin{bmatrix} \theta_x' \\ \theta_y' \end{bmatrix} = \begin{bmatrix} \arccos\left(\frac{y'}{x'}\right) \\ \arccos\left(\frac{z'}{\sqrt{x'^2 + y'^2 + z'^2}}\right) \end{bmatrix}$$

The transformation above may result in smoothness around corners and edges mapped by the transformation, when viewed from inside the sphere.

Illustrative Implementations

Figure 18:
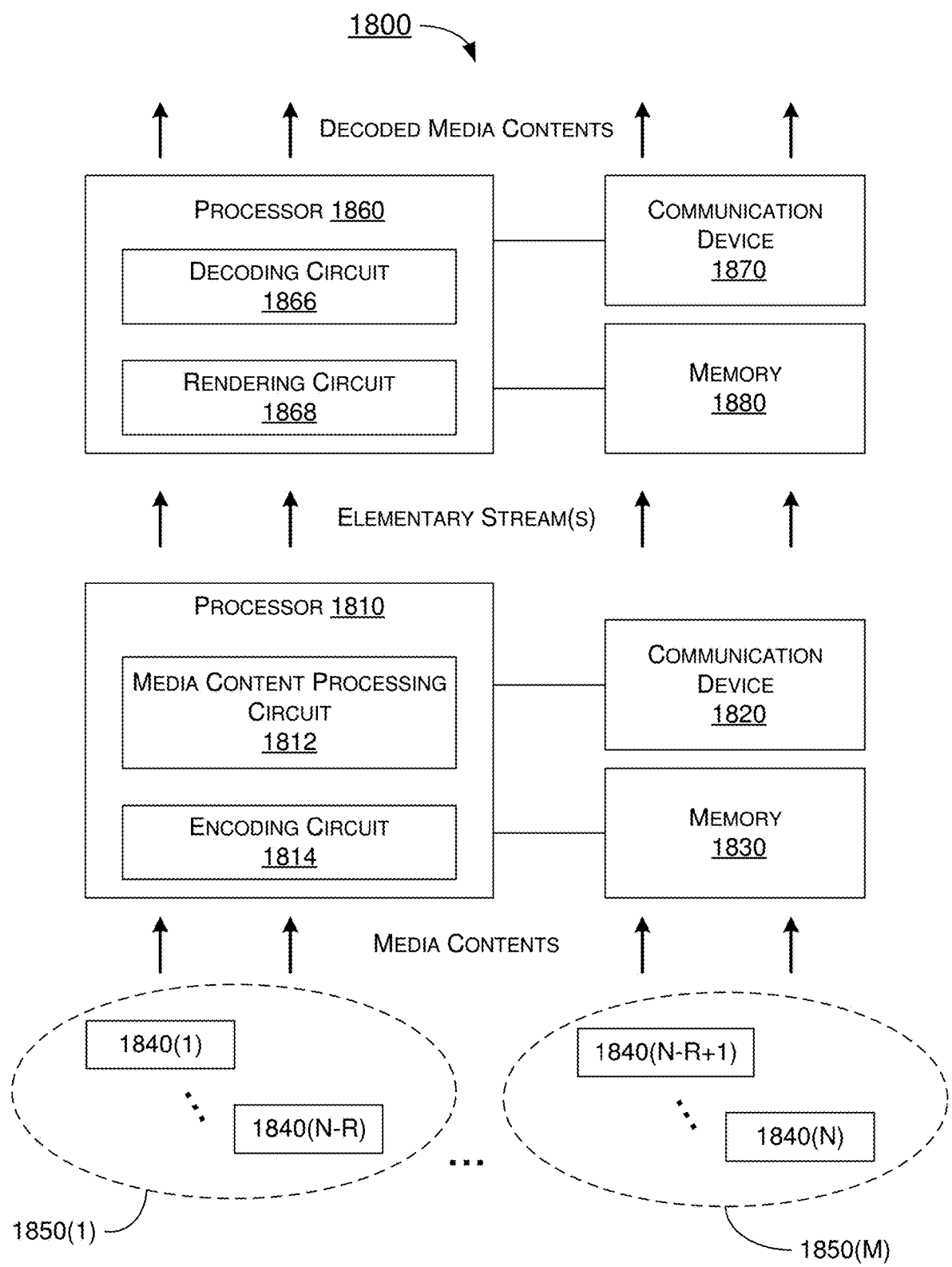
FIG. 18 is a diagram of an example apparatus in accordance with the present disclosure.

FIG. 18 illustrates an example apparatus 1800 in accordance with an implementation of the present disclosure. Apparatus 1800 may perform various functions to implement schemes, techniques, processes and methods described herein pertaining to specifying, signaling and using CICP in processing media contents from multiple media sources, including the various schemes, concepts and examples described above with respect to FIG. 1~FIG. 16 described above as well as process 1900 described below.

Apparatus 1800 may be a part of an electronic apparatus, which may be a portable or mobile apparatus, a wearable apparatus, a wireless communication apparatus or a computing apparatus. For instance, apparatus 1800 may be implemented in a smartphone, a smartwatch, a personal digital assistant, a digital camera, or a computing equipment such as a tablet computer, a laptop computer or a notebook computer. Apparatus 1800 may also be a part of a machine type apparatus, which may be an Internet-of-Things (IoT) apparatus such as an immobile or a stationary apparatus, a home apparatus, a wire communication apparatus or a computing apparatus.

In some implementations, apparatus 1800 may be implemented in the form of one or more integrated-circuit (IC) chips such as, for example and without limitation, one or more single-core processors, one or more multi-core processors, or one or more complex-instruction-set-computing (CISC) processors. Apparatus 1800 may include at least some of those components shown in FIG. 18 such as a first processor 1810 and a second processor 1860, for example. Apparatus 1800 may further include one or more other components not pertinent to the proposed scheme of the present disclosure (e.g., internal power supply, display device and/or user interface device), and, thus, such component(s) of apparatus 1800 are neither shown in FIG. 18 nor described below in the interest of simplicity and brevity.

In one aspect, each of processor 1810 and processor 1860 may be implemented in the form of one or more single-core processors, one or more multi-core processors, or one or more CISC processors. That is, even though a singular term "a processor" is used herein to refer to each of processor 1810 and processor 1860, each of processor 1810 and processor 1860 may include multiple processors in some implementations and a single processor in other implementations in accordance with the present disclosure. In another aspect, each of processor 1810 and processor 1860 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1810 and processor 1860 is a special-purpose machine specifically designed, arranged and configured to perform specific tasks including those pertaining to specifying, signaling and using CICP in processing media contents from multiple media sources in accordance with various implementations of the present disclosure. Processor 1810 may include a media content processing circuit 1812, an encoding circuit 1814. Processor 1860 may include a decoding circuit 1866 and a rendering circuit 1868. Decoding circuit 1866 may be capable of decoding encoded media contents. Rendering circuit 1868 may be capable of rendering the decoded media contents for display (by apparatus 1800 or a remote apparatus or device).

For instance, decoding circuit 1866 may be capable of decoding at least one elementary stream containing encoded media contents captured by a plurality of media sources in one or more clusters and a plurality of coding-independent code points for the plurality of media sources to provide one or more streams of decoded media contents. Moreover, rendering circuit 1868 may be capable of rendering one or more viewports, one or more regions, or a combination thereof based on video contents in the streams of decoded media contents by using, for example, a CICP that characterizes a reverse projection type of each of the one or more viewports and a CICP that characterizes a reverse mapping type of each of the one or more regions.

In some implementations, apparatus 1800 may also include a communication device 1820 coupled to processor 1820 as well as a communication device 1870 coupled to processor 1860. Each of communication device 1820 and communication device 1870 may include a transceiver that is capable of transmitting and receiving data, information and/or signals wirelessly and/or via wired medium(s). In some implementations, apparatus 1800 may further include a memory 1830 coupled to processor 1810 as well as a memory 1880 coupled to processor 1860, each being capable of being accessed by processor 1810 or processor 1860, respectively, and storing data therein. Each of memory 1830 and memory 1880 may include a type of random-access memory (RAM) such as dynamic RAM (DRAM), static RAM (SRAM), thyristor RAM (T-RAM) and/or zero-capacitor RAM (Z-RAM). Alternatively or additionally, each of memory 1830 and memory 1880 may include a type of read-only memory (ROM) such as mask ROM, programmable ROM (PROM), erasable programmable ROM (EPROM) and/or electrically erasable programmable ROM (EEPROM).

Alternatively or additionally, each of memory 1830 and memory 1880 may include a type of non-volatile random-access memory (NVRAM) such as flash memory, solid-state memory, ferroelectric RAM (FeRAM), magnetoresistive RAM (MRAM) and/or phase-change memory.

In some implementations, media content processing circuit 1812 may be capable of receiving (e.g., via communication device 1820) media contents captured by a plurality of media sources 1840(1)~1840(N) in one or more clusters 1850(1)~1850(M), where each of N and M is a positive integer. Each of the plurality of media sources 1840(1)~1840(N) may be a camera, an optical sensor, an image sensor, an audio sensor or another type of sensor. Media content processing circuit 1812 may also be capable of processing the media contents to provide a plurality of coding-independent code points for the plurality of media sources in accordance with the present disclosure. Encoding circuit 1814 may be capable of encoding the media contents to provide at least one elementary stream.

In the interest of brevity and to avoid redundancy, detailed description of further functions, capabilities and operations of apparatus 1800 is provided below with respect to process 1900.

Figure 19:
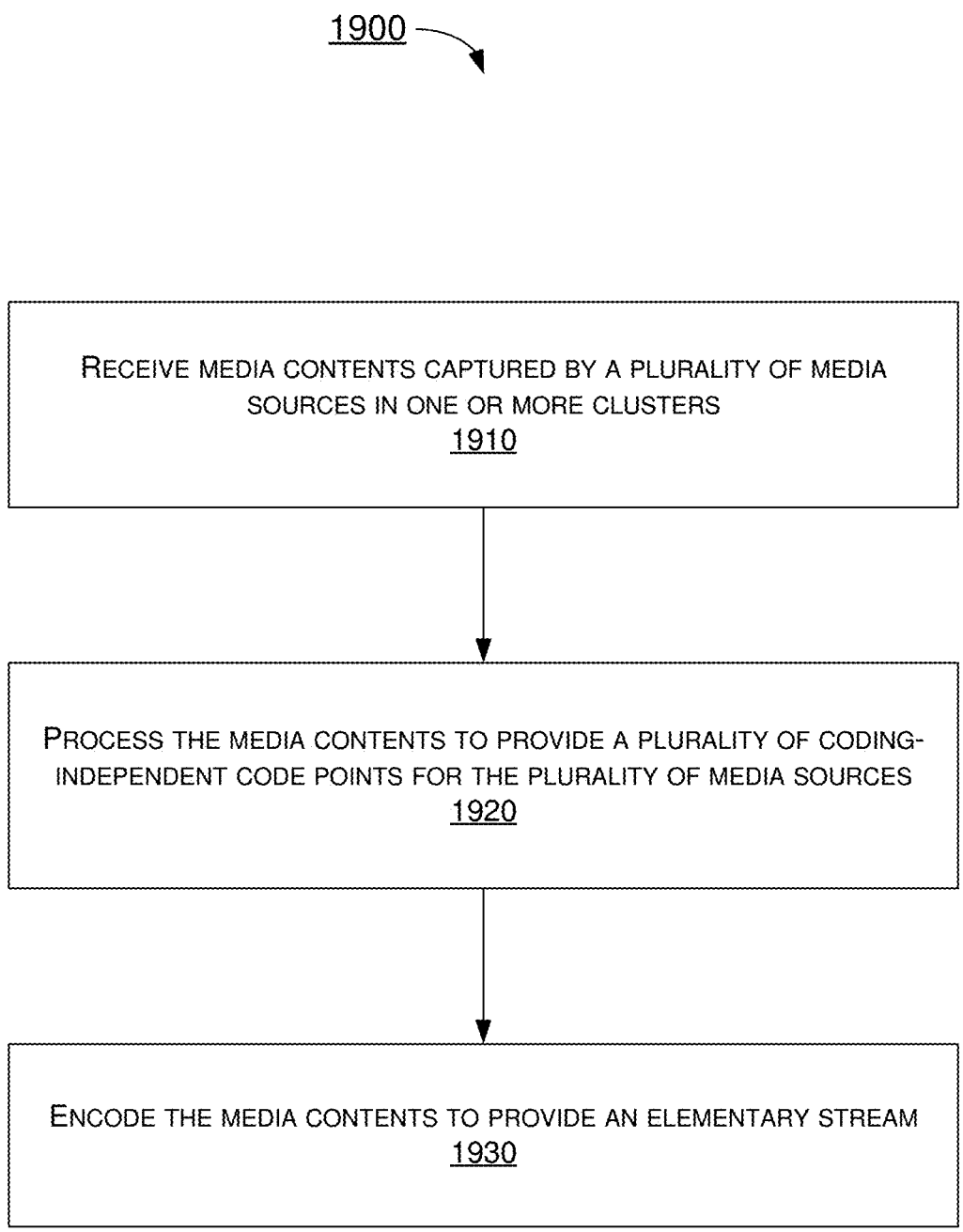
FIG. 19 is a flowchart of a process in accordance with the present disclosure.

FIG. 19 illustrates an example process 1900 in accordance with an implementation of the present disclosure. Process 1900 may represent an aspect of implementing the proposed concepts and schemes such as one or more of the various schemes, concepts and examples described above with respect to FIG. 1~FIG. 18. More specifically, process 1900 may represent an aspect of the proposed concepts and schemes pertaining to specifying, signaling and using CICP in processing media contents from multiple media sources. For instance, process 1900 may be an example implementation, whether partially or completely, of the proposed schemes, concepts and examples described above for specifying, signaling and using CICP in processing media contents from multiple media sources. Process 1900 may include one or more operations, actions, or functions as illustrated by one or more of blocks 1910, 1920 and 1930. Although illustrated as discrete blocks, various blocks of process 1900 may be divided into additional blocks, combined into fewer blocks, or eliminated, depending on the desired implementation. Moreover, the blocks of process 1900 may be executed in the order shown in FIG. 19 or, alternatively in a different order. The blocks of process 1900 may be executed iteratively. Process 1900 may be implemented by or in apparatus 1800 as well as any variations thereof. Solely for illustrative purposes and without limiting the scope, process 1900 is described below with reference to apparatus 1800. Process 1900 may begin at block 1910.

At 1910, process 1900 may involve media content processing circuit 1812 of apparatus 1800 receiving media contents captured by a plurality of media sources 1840(1)~1840(N) in one or more clusters 1850(1)~1850(M). Process 1900 may proceed from 1910 to 1920.

At 1920, process 1900 may involve media content processing circuit 1812 processing the media contents to provide a plurality of coding-independent code points for the plurality of media sources 1840(1)~1840(N). Process 1900 may proceed from 1920 to 1930.

At 1930, process 1900 may involve encoding circuit 1814 of apparatus 1800 encoding the media contents to provide at least one elementary stream.

In some implementations, in processing the media contents to provide the plurality of coding-independent code points for the plurality of media sources, process 1900 may involve media content processing circuit 1812 generating the plurality of coding-independent code points as characteristics of signals of the media contents from the plurality of media sources.

In some implementations, the media contents may include video contents. In such cases, the plurality of coding-independent code points may characterize a projection type that indicates a type of projection of a list of viewports onto a list of regions. The type of projection may include sphere unfolding, cube unfolding, or ring unfolding. In some implementations, the plurality of coding-independent code points may also characterize a reverse projection type that indicates a type of reverse projection of the list of regions onto the list of viewports. The type of reverse projection may include sphere forming, cube forming, or ring forming.

In some implementations, the media contents may include video contents. In such cases, the plurality of coding-independent code points may characterize a mapping type that indicates a type of mapping of a first list of regions onto a second list of regions. The type of mapping may include array tiling, T tiling, or line tiling. In some implementations, the plurality of coding-independent code points may also characterize a reverse mapping type that indicates a type of reverse mapping of the second list of regions onto the first list of regions. The type of reverse mapping may include array de-tiling, T de-tiling, or line de-tiling.

In some implementations, the plurality of coding-independent code points may characterize one or more profiles of one or more types of application of the coding-independent code points.

In some implementations, each profile of the one or more profiles may include information indicating one or more aspects of a plurality of aspects. The plurality of aspects may include the following: a geometry type of the plurality of media sources, a geometry surface identification, a respective amount of translation of each of one or more viewports, a respective amount of rotation of each of the one or more viewports, a respective location of each of one or more regions, a respective view of each of the one or more viewports and the one or more regions, a type of projection, a type of mapping, a type of reverse mapping (if not implied by the type of mapping), and a type of reverse projection (if not implied by the type of projection).

In some implementations, the one or more types of application may include virtual reality (VR), and the one or more profiles may include a spherical VR profile and/or a cubical VR profile. Alternatively, the one or more types of application may include free viewpoint television (FVT), and the one or more profiles may include a FVT profile.

In some implementations, the plurality of coding-independent code points may include code points for one or more aspects of a plurality of aspects related to the one or more clusters. The plurality of aspects may include the following: a cluster identification value of each of the one or more clusters, a cluster size of each of the one or more clusters, a cluster position index indicating a position of a respective one of the plurality of media sources within each cluster of the one or more clusters, a cluster geometry type indicating a type of a geometric arrangement of a respective subset of the plurality of media sources within each cluster of the one or more clusters, a respective amount of translation of each of one or more viewports, a respective amount of rotation of each of the one or more viewports, a respective location of each of one or more regions, a respective view of each of the one or more viewports and the one or more regions, a type of projection, a type of mapping, a type of reverse mapping, and a type of reverse projection.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving media contents captured by a plurality of media sources in one or more clusters;
   processing the media contents to provide a plurality of coding-independent code points for the plurality of media sources; and encoding the media contents to provide at least one elementary stream, wherein the plurality of coding-independent code points comprise code points for one or more aspects of a plurality of aspects related to the one or more clusters, the plurality of aspects comprising:

a cluster geometry type indicating a type of a geometric arrangement of a respective subset of the plurality of media sources within each cluster of the one or more clusters; and a respective amount of translation of each of one or more viewports.

2. The method of claim 1, wherein the processing of the media contents to provide the plurality of coding-independent code points for the plurality of media sources comprises generating the plurality of coding-independent code points as characteristics of signals of the media contents from the plurality of media sources.

3. The method of claim 1, wherein the media contents comprise video contents, wherein the plurality of coding-independent code points characterize a projection type that indicates a type of projection of a list of viewports onto a list of regions, and wherein the type of projection comprises sphere unfolding, cube unfolding, or ring unfolding.

4. The method of claim 3, wherein the plurality of coding-independent code points further characterize a reverse projection type that indicates a type of reverse projection of the list of regions onto the list of viewports, and wherein the type of reverse projection comprises sphere forming, cube forming, or ring forming.

5. The method of claim 1, wherein the media contents comprise video contents, wherein the plurality of coding-independent code points characterize a mapping type that indicates a type of mapping of a first list of regions onto a second list of regions, and wherein the type of mapping comprises array tiling, T tiling, or line tiling.

6. The method of claim 5, wherein the plurality of coding-independent code points further characterize a reverse mapping type that indicates a type of reverse mapping of the second list of regions onto the first list of regions, and wherein the type of reverse mapping comprises array de-tiling, T de-tiling, or line de-tiling.

7. The method of claim 1, wherein the plurality of coding-independent code points characterize one or more profiles of one or more types of application of the coding-independent code points.

8. The method of claim 7, wherein each profile of the one or more profiles comprises information indicating one or more aspects of a plurality of aspects, the plurality of aspects comprising:

a geometry type of the plurality of media sources;
a geometry surface identification;
a respective amount of translation of each of one or more viewports;
a respective amount of rotation of each of the one or more viewports;
a respective location of each of one or more regions;
a respective view of each of the one or more viewports and the one or more regions;
a type of projection;
a type of mapping;
a type of reverse mapping, if not implied by the type of mapping; and
a type of reverse projection, if not implied by the type of projection.

9. The method of claim 7, wherein the one or more types of application comprise virtual reality (VR), and wherein the one or more profiles comprises a spherical VR profile or a cubical VR profile.

10. The method of claim 7, wherein the one or more types of application comprise free viewpoint television (FVT), and wherein the one or more profiles comprises a FVT profile.

11. The method of claim 1, wherein the plurality of aspects further comprise:

a cluster identification value of each of the one or more clusters;
a cluster size of each of the one or more clusters;
a cluster position index indicating a position of a respective one of the plurality of media sources within each cluster of the one or more clusters;
a respective amount of rotation of each of the one or more viewports;
a respective location of each of one or more regions;
a respective view of each of the one or more viewports and the one or more regions;
a type of projection;
a type of mapping;
a type of reverse mapping, if not implied by the type of mapping; and
a type of reverse projection, if not implied by the type of projection.

12. An apparatus, comprising:

a processing circuit configured to receive media contents captured by a plurality of media sources in one or more clusters, the processing circuit further configured to process the media contents to provide a plurality of coding-independent code points for the plurality of media sources; and an encoding circuit configured to encode the media contents to provide at least one elementary stream, wherein the plurality of coding-independent code points comprise code points for one or more aspects of a plurality of aspects related to the one or more clusters, the plurality of aspects comprising:

a cluster geometry type indicating a type of a geometric arrangement of a respective subset of the plurality of media sources within each cluster of the one or more clusters; and a respective amount of translation of each of one or more viewports.

13. The apparatus of claim 12, wherein the media contents comprise video contents, wherein the plurality of coding-independent code points characterize a projection type that indicates a type of projection of a list of viewports onto a list of regions, wherein the type of projection comprises sphere unfolding, cube unfolding, or ring unfolding, wherein the plurality of coding-independent code points further characterize a reverse projection type that indicates a type of reverse projection of the list of regions onto the list of viewports, and wherein the type of reverse projection comprises sphere forming, cube forming, or ring forming.

14. The apparatus of claim 12, wherein the media contents comprise video contents, wherein the plurality of coding-independent code points characterize a mapping type that indicates a type of mapping of a first list of regions onto a second list of regions, wherein the type of mapping comprises array tiling, T tiling, or line tiling, wherein the plurality of coding-independent code points further characterize a reverse mapping type that indicates a type of reverse mapping of the second list of regions onto the first list of regions, and wherein the type of reverse mapping comprises array de-tiling, T de-tiling, or line de-tiling.

15. The apparatus of claim 12, wherein the plurality of coding-independent code points characterize one or more profiles of one or more types of application of the coding-independent code points, and wherein each profile of the one or more profiles comprises information indicating one or more aspects of a plurality of aspects, the plurality of aspects comprising:
   a geometry type of the plurality of media sources;
   a geometry surface identification;
   a respective amount of translation of each of one or more viewports;
   a respective amount of rotation of each of the one or more viewports;
   a respective location of each of one or more regions;
   a respective view of each of the one or more viewports and the one or more regions;
   a type of projection;
   a type of mapping;
   a type of reverse mapping, if not implied by the type of mapping; and
   a type of reverse projection, if not implied by the type of projection.

16. The apparatus of claim 12, wherein the plurality of coding-independent code points characterize one or more profiles of one or more types of application of the coding-independent code points, and wherein the one or more types of application comprise virtual reality (VR), and wherein the one or more profiles comprises a spherical VR profile or a cubical VR profile.

17. The apparatus of claim 12, wherein the plurality of coding-independent code points characterize one or more profiles of one or more types of application of the coding-independent code points, and wherein the one or more types of application comprise free viewpoint television (FVT), and wherein the one or more profiles comprises a FVT profile.

18. The apparatus of claim 12, wherein the plurality of coding-independent code points comprise code points for one or more aspects of a plurality of aspects related to the one or more clusters, the plurality of aspects comprising:
   a cluster identification value of each of the one or more clusters;
   a cluster size of each of the one or more clusters;
   a cluster position index indicating a position of a respective one of the plurality of media sources within each cluster of the one or more clusters;
   a cluster geometry type indicating a type of a geometric arrangement of a respective subset of the plurality of media sources within each cluster of the one or more clusters;
   a respective amount of translation of each of one or more viewports;
   a respective amount of rotation of each of the one or more viewports;
   a respective location of each of one or more regions;
   a respective view of each of the one or more viewports and the one or more regions;
   a type of projection;
   a type of mapping;
   a type of reverse mapping, if not implied by the type of mapping; and
   a type of reverse projection, if not implied by the type of projection.

19. An apparatus, comprising:
   a decoding circuit configured to decode at least one elementary stream containing encoded media contents captured by a plurality of media sources in one or more clusters and a plurality of coding-independent code points for the plurality of media sources to provide one or more streams of decoded media contents; and
   a rendering circuit configured to render one or more viewports, one or more regions, or a combination thereof based on video contents in the streams of decoded media contents,
   wherein the plurality of coding-independent code points comprise code points for one or more aspects of a plurality of aspects related to the one or more clusters, the plurality of aspects comprising:
      a cluster geometry type indicating a type of a geometric arrangement of a respective subset of the plurality of media sources within each cluster of the one or more clusters; and
      a respective amount of translation of each of one or more viewports.

20. The apparatus of claim 19, wherein the plurality of coding-independent code points characterize a reverse projection type that indicates a type of reverse projection of the list of regions onto the list of viewports, wherein the plurality of coding-independent code points further characterize a reverse mapping type that indicates a type of reverse mapping of a second list of regions onto a first list of regions, and wherein the rendering circuit is capable of rendering the one or more viewports and the one or more regions using the plurality of coding-independent code points.

* * * * *